(12) United States Patent
Abe et al.

(10) Patent No.: US 6,231,448 B1
(45) Date of Patent: May 15, 2001

(54) POWER STEERING SYSTEM

(75) Inventors: Hideaki Abe; Susumu Aoki, both of Kiryu; Hideki Furuuchi, Isesaki, all of (JP)

(73) Assignee: Mitsuba Corporation, Gunma-Ken (JP)

( * ) Notice: Subject to any disclaimer, the term of this patent is extended or adjusted under 35 U.S.C. 154(b) by 0 days.

(21) Appl. No.: 09/076,357

(22) Filed: May 12, 1998

(30) Foreign Application Priority Data

May 16, 1997 (JP) .................................................. 9-127665
May 29, 1997 (JP) .................................................. 9-140555
Apr. 3, 1998 (JP) .................................................. 10-091971

(51) Int. Cl.$^7$ ....................................................... F16D 7/02
(52) U.S. Cl. ................................................................ 464/46
(58) Field of Search .................................. 464/46, 47, 84, 464/45; 180/444; 192/56.55; 1/56.6

(56) References Cited

U.S. PATENT DOCUMENTS

| | | | | |
|---|---|---|---|---|
| 2,655,015 | * | 10/1953 | Linder | 192/56.55 X |
| 2,737,792 | | 3/1956 | Dyer . | |
| 3,064,455 | * | 11/1962 | Gros | 464/46 X |
| 3,118,292 | * | 1/1964 | Schroter et al. | 464/46 X |
| 4,373,358 | | 2/1983 | Pearch et al. . | |
| 4,501,570 | | 2/1985 | Konrad . | |
| 4,883,152 | * | 11/1989 | Froment | 464/46 X |
| 5,147,006 | * | 9/1992 | Weissbrich et al. | 180/444 |
| 5,533,712 | * | 7/1996 | Fukikawa et al. | 464/46 X |
| 6,019,636 | * | 2/2000 | Langham | 439/584 |

FOREIGN PATENT DOCUMENTS 0 627 352 A1   12/1994 (EP) .
2 297 000      7/1996 (GB) .
6-87143       12/1994 (JP) .
9-84300        3/1997 (JP) .

\* cited by examiner

Primary Examiner—Lynne H. Browne
Assistant Examiner—Greg Binda
(74) Attorney, Agent, or Firm—Darby & Darby

(57) ABSTRACT

A power steering system to reduce the moment of inertia of the torque limiter and to accurately determine pressing force by a forcing member is provided. The torque limiter of the system has a basic structure in which a substantially-cylindrical rotating member which is rotatable together with one of the output shaft and the input shaft; and a rotated member which is rotatable together with the other of the output shaft and the input shaft, and which is forced toward the rotating member side by a forcing member supported by the rotating member. Typically, the rotating member is a substantially-cylindrical limiter cover with a bottom, and the rotated member is a limiter plate contained in the limiter cover. The forcing member may be supported by a concave portion formed in an inner-peripheral area of the limiter cover, or may be supported by a projecting portion which is formed by deforming the cylindrical portion of the limiter cover toward the inside. In the above basic structure, the rotated member may separately comprise a cylindrical portion, on the inner-peripheral surface of which plural splines are formed in parallel with its axial direction, these splines being engaged with the splines formed in the outer-peripheral surface of the other of the output shaft and the input shaft; and a flange portion, which is forced toward the rotating member side, by which the flange portion functions as a friction clutch. In this structure, efficiency of forming the limiter plate can be improved.

5 Claims, 16 Drawing Sheets

POWER STEERING SYSTEM

BACKGROUND OF THE INVENTION

1. Field of the Invention

The present invention relates to a power steering system for generating an auxiliary steering force for the steering of a vehicle such as a four-wheel-drive car or the like.

2. Description of the Related Art

FIG. 16 shows an example of a power steering system. The power steering system as shown in FIG. 16 is disclosed in Japanese Patent Application, First Publication, No. Hei 9-84300, in which output shaft 2 of driving unit (i.e., motor) 1 for generating the above auxiliary steering force and input shaft 3 coupled to the steering unit of a vehicle are coupled via torque limiter 4. This torque limiter 4 comprises cylindrical limiter cover (or case) 5 having a bottom, fixed in a manner such that the cover is rotationally driven together with the output shaft 2, similar cylindrical cover 6 having a bottom, which covers from the opening side to the outer surface of the limiter cover 5, limiter plate (or boss) 7 which is arranged to be relatively rotatable with respect to limiter cover 5 and is coupled to the input shaft 3, and friction plate 9 which is arranged between cover 6 and limiter plate 7 via forcing member (or spring member) 8 so as to be driven together with the limiter cover 5 and which is relatively rotatable with respect to the limiter plate 7.

The above cover 6 is attached on limiter cover 5 after limiter plate 7, forcing member 8, and friction plate 9 are set in the limiter cover 5. The cover 6 is fixed by folding down and clamping the peripheral edge of its opening side, and forcing member 8 comes in contact with the bottom of the cover 6, by which pressing force by this forcing member 8 is supported. In the power steering system having the above-described structure, during ordinary steering, auxiliary steering force generated from driving unit 1 is properly transmitted from output shaft 2 via torque limiter 4 to input shaft 3 by frictional force generated between limiter cover 5, friction plate 9, and limiter plate 7 caused by pressing force of forcing member 8. In a case in which impact force is transmitted from the wheel side of the steering unit, a slip is generated between limiter cover 5, friction plate 9, and limiter plate 7 of torque limiter 4, and impact torque is absorbed; thus, it is possible to prevent excessive torque from acting on output shaft 2 of driving unit 1.

In torque limiter 4 in such a power steering system, a predetermined frictional force is generated between limiter cover 5, friction plate 9, and limiter plate 7, as described above; thus, it is necessary to ensure sufficient contact areas between these members. Accordingly, it is inevitable that the outer diameter of torque limiter 4 is considerably large. However, in a torque limiter having such a large outer diameter, which is rotated together with output shaft 2 and input shaft 3, the moment of inertia of this torque limiter 4 also becomes large, and there occur problems in that the driving force necessary for rotationally driving output and input shafts 2 and 3 is increased, and follow-up capability between rotation of input shaft 3 and rotation of output shaft 2 is degraded. In particular, in the above conventional power steering system, cover 6 is arranged to cover the outer surface of limiter cover 5. Therefore, the outer diameter of torque limiter 4 is further increased and the moment of inertia is also increased; thus, the above-mentioned problems are assumed to be very substantial.

Also in torque limiter 4 in the above power steering system, it is required that during ordinary steering, auxiliary steering force be properly transmitted from output shaft 2 to input shaft 3, while when impact force acts thereon, impact torque is securely absorbed, as described above. Therefore, pressing force caused by the forcing member 8 must be strictly controlled so as to set the friction force between limiter cover 5, friction plate 9, and limiter plate 7 to be in a predetermined range. However, in the above conventional power steering system, the pressing force caused by the forcing member 8 is supported by cover 6 which covers limiter cover 5, and the opening of this cover 6 is simply clamped and fixed to limiter cover 5. Therefore, the support position of forcing member 8 is liable to change according to clamping conditions, and there is also a possibility that cover 6 will shift due to spring-back and deformation of the clamped opening of cover 6, by which support of forcing member 8 becomes unstable. According to the above possibilities, there occurs another problem in that predetermined frictional force is not provided between limiter cover 5, friction plate 9, and limiter plate 7.

SUMMARY OF THE INVENTION

In consideration of the above circumstances, the present invention provides a power steering system based on a first objective to reduce the moment of inertia of the torque limiter, and on a second objective to accurately determine pressing force by a forcing member.

In addition, the present invention has a further objective to improve efficiency of forming a limiter plate as a constituent of the torque limiter of the power steering system.

In order to realize the above objectives, the present invention provides a power steering system in which an output shaft of a driving unit and an input shaft of a steering unit are coupled via a torque limiter, the torque limiter comprising: a substantially-cylindrical rotating member which is rotatable together with one of the output shaft and the input shaft; and a rotated member which is rotatable together with the other of the output shaft and the input shaft, and which is forced toward the rotating member side by a forcing member supported by the rotating member.

Regarding the above basic structure, a typical example is such that the rotating member is a substantially-cylindrical limiter cover with a bottom, and the rotated member is a limiter plate contained in the limiter cover.

In the above typical example, it is possible for the forcing member to be supported by a concave portion formed in an inner-peripheral area of the limiter cover.

According to such a structure, the forcing member is supported by a concave portion formed in an inner-peripheral area of the limiter cover; thus, in contrast to the above-mentioned conventional power steering system, it is unnecessary to provide a cover (6) for supporting the forcing member (8). In this case, it is possible to prevent the outer diameter of the torque limiter from exceeding the outer diameter of the limiter cover and to regard the outer diameter as that of the torque limiter. Therefore, the moment of inertia of the torque limiter can be reduced. Accordingly, the driving force of the driving unit can be reduced and rapid follow-up between rotation of the input shaft and rotation of the output shaft can be realized, and good steering response can be obtained.

In the conventional structure which includes a cover (6) attached to the limiter cover (5) by clamping the opening portion of the cover (6), the position where the forcing member is supported may be shifted depending on clamping conditions, or due to deformation by spring-back, by which support of the forcing member becomes unstable. In contrast, according to the support by providing the concave portion formed in the limiter cover as described above, the above problems can be prevented, and it is possible to accurately position the forcing member in the limiter cover and to easily and accurately set the relevant force to be a predetermined size. Consequently, during ordinary steering, the output shaft and the input shaft can be stably rotated integrally, while if an impact force acts on the steering unit side, it is possible to more reliably generate sliding and to prevent excessive torque from being transmitted.

In the concave portion, a ring-shaped member having an inner-diameter smaller than the diameter of the inner-peripheral area may be fit, and the forcing member is supported via the ring-shaped member. In this arrangement, the limiter plate can be more stably forced in comparison with an arrangement in which a portion fit to the concave portion is provided in the forcing member so as to directly support the forcing member via the concave portion. In this case, it is desirable that the concave portion be circularly formed in the inner-peripheral area of the limiter cover, and the ring-shaped member be a C-ring having a slightly reduced diameter and which is forced toward its expanding directions when placed in the concave portion. In this structure, the mounting strength of the ring-shaped member can be improved according to the force generated by expansion of the C-ring; therefore, it is possible to more accurately position and stably support the forcing member.

On the other hand, in the above typical example of the present invention, the forcing member may be supported by a projecting portion which is formed by deforming the cylindrical portion of the limiter cover toward the inside.

According to this structure, the forcing member is supported by a projecting portion formed by deforming the cylindrical portion of the limiter cover toward the inside; thus, also in this case, it is unnecessary to provide an additional cover for supporting the forcing member. Therefore, the outer diameter of the torque limiter can be prevented from exceeding that of the limiter cover. In addition, as the above projecting portion is formed by deforming the cylindrical portion of the limiter cover from the outside toward the inside, the moment of inertia of the limiter cover can be reduced by the weight of this projecting portion. According to these features, the moment of inertia of the torque limiter can be generally reduced. Consequently, the driving force of the driving unit can be reduced and rapid follow-up between rotation of the input shaft and rotation of the output shaft can be realized, and good steering response can also be obtained in this case.

It is also possible that:
(i) the projecting portion be formed by shearing a part of the cylindrical portion in a radial direction along a circumferential line and simultaneously pressing the sheared part toward the inside, or that
(ii) the projecting portion be formed by deforming a flexible portion, which is formed by a cut provided in a circumferential line of the cylindrical portion of the limiter cover, toward the inside in a radial direction of the cylindrical portion.

In these cases, the projecting portion can be provided by deforming the sheared part of the cylindrical portion, or the flexible portion formed using the cut, not in (parallel with) the center-axis direction of the limiter cover, but only toward the inside. Therefore, in comparison with the conventional case in which the opening portion of a cover attached to the limiter cover is fold up and clamped, shifts of the position, where the forcing member is supported, depending on the clamping conditions, can be prevented. In this case, even if spring-back occurs, the projecting portion is deformed only toward the outside in a radial direction of the limiter cover. Therefore, it is possible to stably support the forcing member and accurately position the forcing member in the limiter cover, and pressing force by the forcing member can be easily and accurately set to be a predetermined size. Consequently, also in this arrangement, during ordinary steering, the output shaft and the input shaft can be stably rotated integrally, while if an impact force acts on the steering unit side, it is possible to more reliably generate sliding and to prevent excessive torque from being transmitted.

Typically, in the above arrangements in which the projecting portion is formed by shearing and deforming the cylindrical portion, or by deforming a flexible portion formed using a cut, a plurality of the projecting portion are separately positioned in a circumferential line of the limiter cover. In this case, it is preferable that a disk-shaped plate be placed between the projecting portions and the forcing member, by which the forcing member can be more stably supported via the whole circumferential line in the plate even though the projecting portions are separately positioned.

In each arrangement described above, by coaxially coupling one of the output shaft and the input shaft and the limiter plate via a metal bush so as to enable relative rotation, the other of the output shaft and the input shaft which is rotatable together with the limiter plate can be coaxially arranged with the one of the output shaft and the input shaft, that is, "coaxiability" between the output shaft and the input shaft can be established.

Furthermore, in the above basic structure, the following arrangement is also possible, that is, in the outer-peripheral surface of the other of the output shaft and the input shaft, plural splines are formed in parallel with an axial direction of the relevant shaft; the rotated member separately comprises:
(i) a cylindrical portion, on the inner-peripheral surface of which plural splines are formed in parallel with its axial direction, these splines being engaged with the splines formed in the outer-peripheral surface of the other of the output shaft and the input shaft; and
(ii) a flange portion, which is forced toward the rotating member side, by which the flange portion functions as a friction clutch.

Regarding the above engaged sets of splines, one functions as the keyways while the other functions as the keys.

In the torque limiter in the power steering system as structured above, (i) the cylindrical portion, having the splines on the inner-peripheral surface, to which a shaft having splines which can be engaged with above splines is inserted, and (ii) the flange portion which must have a suitable accuracy for functioning as a friction clutch, are separately formed. Therefore, efficient manufacturing is possible in consideration of accuracy requirements relating to formation of each portion. In addition, both portions may be made of different materials; thus, efficiency of forming the limiter plate can be improved and relevant accuracy and strength conditions can be respectively improved.

The cylindrical portion and flange portion may be coupled via a bush, or may be fixed to each other by fitting the side of one end of the cylindrical portion to the flange portion. In the latter case, for example, a concave portion is formed at the flange portion side of the cylindrical portion, to which (concave portion) the flange portion (that is, a plate portion) is fit, and the side of the one end of the cylindrical portion is clamped and fixed to the flange portion.

If the side of the one end of the cylindrical portion is directly fit to the flange portion, a cap is desirably inserted into the cylindrical portion because the area from the side of the one end of the cylindrical portion up to the flange portion is vacant.

DESCRIPTION OF THE PREFERRED EMBODIMENTS

Hereinbelow, embodiments according to the present invention will be explained with reference to the drawings.

Figure 1:
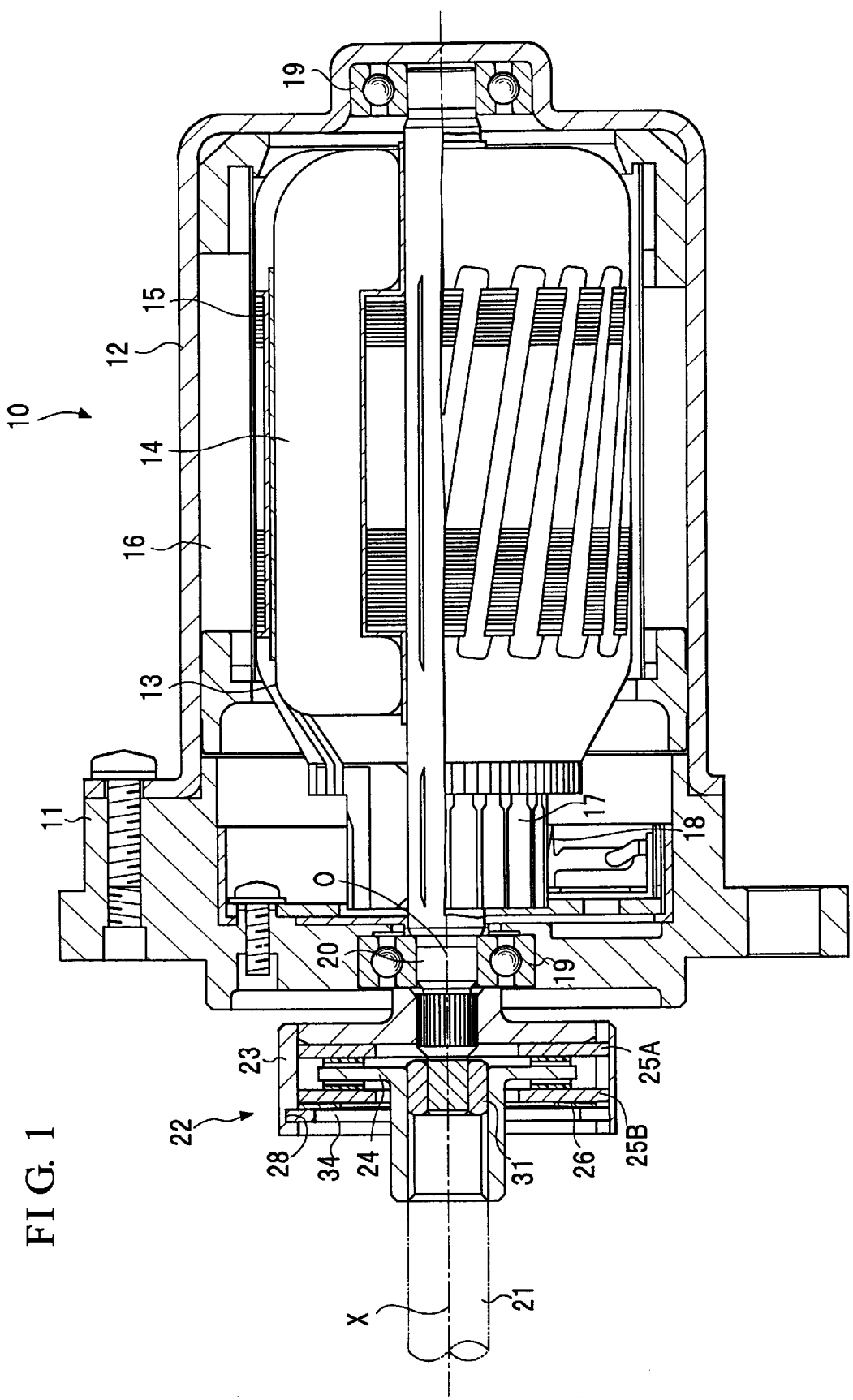
FIG. 1 is a sectional view showing the first embodiment of the present invention.
Figure 2:
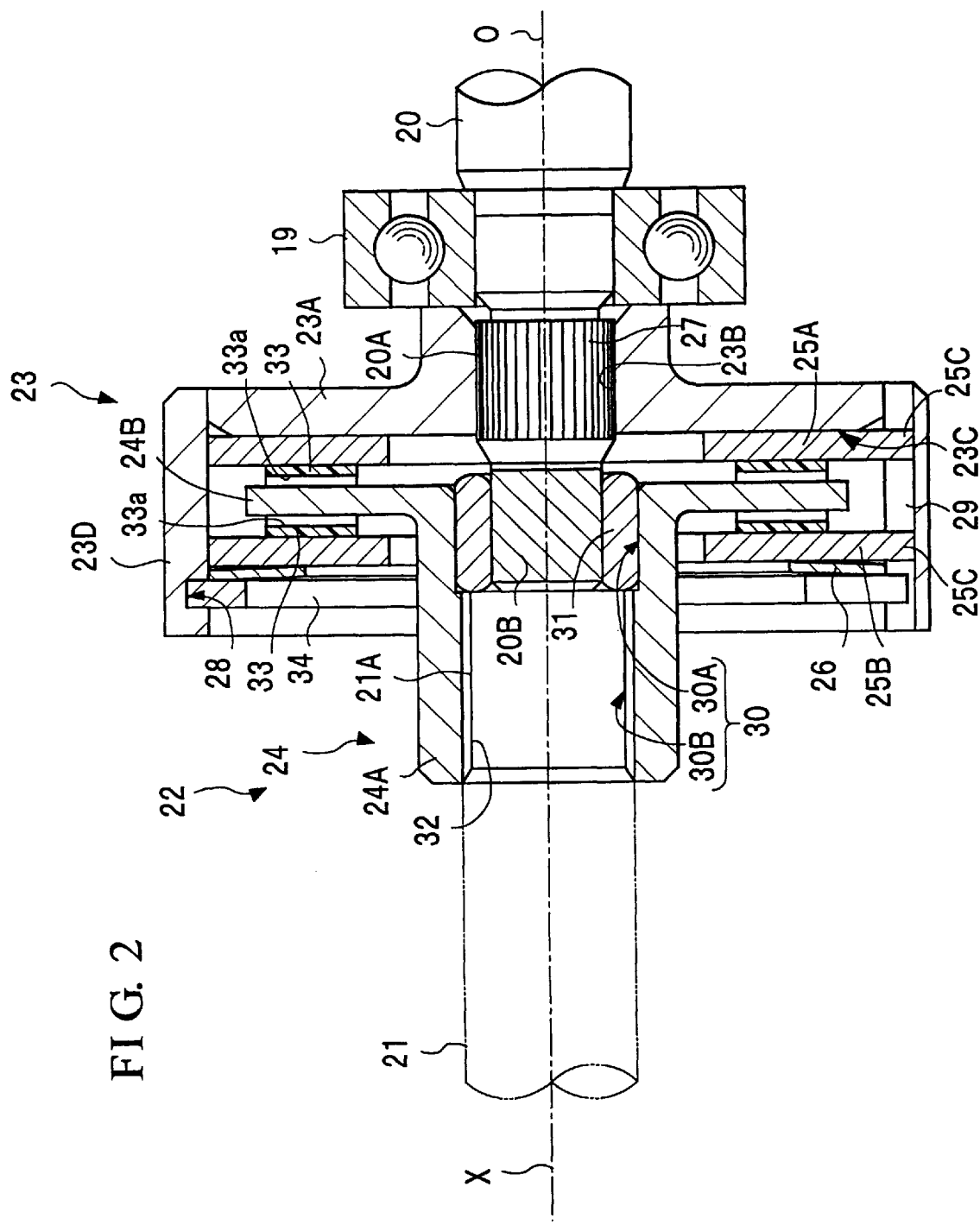
FIG. 2 is an enlarged sectional view of torque limiter 22 in FIG. 1.
Figure 3:
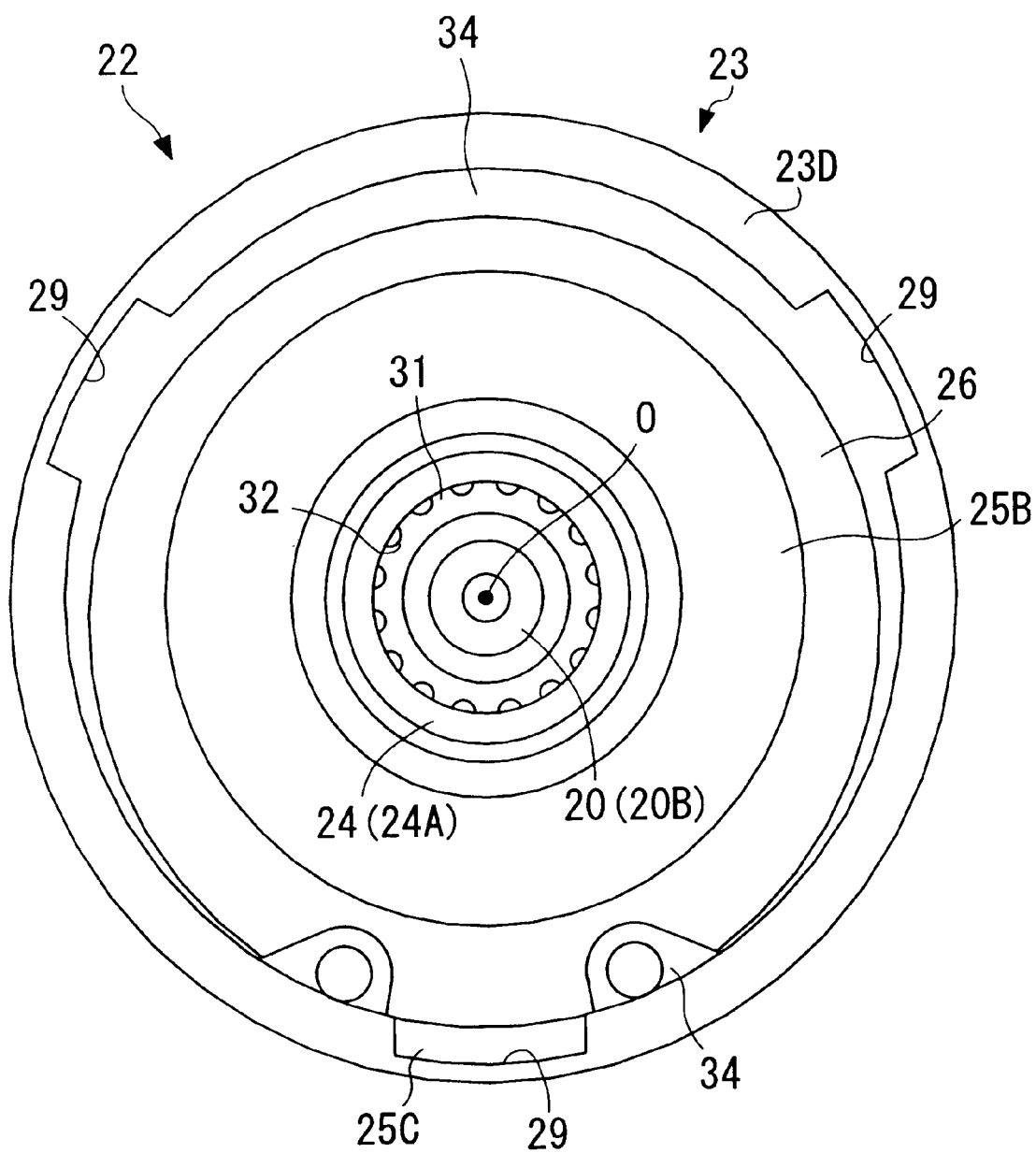
FIG. 3 is a front view of torque limiter 22 shown in FIG. 2, viewed from the input shaft 21 side.

FIGS. 1–3 shows the first embodiment of the present invention. In this embodiment, driving unit 10 corresponds to a conventional motor which includes bracket 11, yoke 12, armature 13, coil 14, core 15, magnet 16, commutator 17, brush 18, bearing 19, and output shaft 20. This output shaft 20 is coupled via torque limiter 22 to input shaft 21 of a steering unit of a vehicle or the like (not shown). The torque limiter 22 comprises limiter cover 23 as a rotating member of the present invention, attached such that this cover is rotatable together with output shaft 20, limiter plate 24 as a rotated member of the present invention, attached such that this plate is rotatable together with input shaft 21, and forcing member 26 for forcing this limiter plate 24 onto limiter cover 23 via a pair of cover disks (i.e., friction plates) 25A and 25B and realizing the integral rotation of limiter plate 24 and limiter cover 23 by frictional force generated by the forcing operation.

The output shaft 20 has a step-form structure in which the front portion of output shaft 20, which projects from bracket 11 of driving unit 10, has two kinds of diameters and the diameter at the head side is smaller than that of the remaining portion (that is, the rear side). On the outer surface of larger-diameter portion 20A at the rear side, spline grooves 27 extending in parallel with the direction of axis O of output shaft 20 are provided. In the present embodiment, the limit cover 23 is cylindrically shaped and has a bottom, and is made of a light metallic material such as aluminum. At the center of the bottom 23A of cover 23, mounting hole 23B is provided along the central axis of limiter cover 23. By pressing the above larger-diameter portion 20A of output shaft 20 into the mounting hole 23B, the above spline grooves 27 are cut into the inner wall of mounting hole 23B of limiter cover 23, and the limiter cover 23 is attached as being coaxial and rotatable together with output shaft 20, as described above, while smaller diameter portion 20B of output shaft 20 projects from bottom face 23C of limiter cover 23.

Here, in the inner surface of cylindrical portion 23D of limiter cover 23, circular groove 28 whose center axis also exists on the above center axis is provided near the opening side of the portion 23D of limiter cover 23. This groove 28 is the so-called "concave portion" in the present embodiment. Also in the inner surface of cylindrical portion 23D, plural concave fitting portions 29 are provided with equal spaces (between any two of them) in a circumferential line, which extend in parallel with the above center axis. These concave fitting portions 29 are formed such that portions of the bottom face 23C side thereof pass through the bottom plate 23A of cover 23.

In limiter plate 24, disk-shaped flange portion 24B is formed at one side of cylindrical mounting portion 24A. In the inner side of the mounting portion 24A, multi-step mounting hole 30 is formed, which includes larger-diameter portion 30A at the side of the flange portion 24B and smaller-diameter portion 30B at the opposite side. Into the larger-diameter portion 30A among these portions, cylindrical metal bush (sintered bearing) 31 is pressed and fit. The smaller-diameter portion 20B of output shaft 20, which projects from bottom face 23C of limiter cover 23, is inserted into the metal bush 31, by which the limiter plate 24 is contained in limiter cover 23 coaxially with output shaft 20 and can freely rotate around axis O relatively with output shaft 20 and limiter cover 23, and can move freely in the direction of axis O.

In addition, in the inner surface of the smaller-diameter portion 30B of mounting hole 30 of limiter plate 24, multiple spline grooves 32 extending in parallel with the center axis of limiter plate 24, that is, the above axis O, are provided with equal spaces ensured in a circumferential line. On the other hand, at the end portion of input shaft 21, multiple splines 21A engaged with the above spline grooves 32 extend in parallel with axis X of input shaft 21. That is, input shaft 21 is inserted into smaller-diameter portion 30B of mounting portion 30 by engaging these splines 21A with the spline grooves 32, by which the limiter plate 24 is mounted to the input shaft 21 such that the plate 24 can integrally rotate with input shaft 21 around axis X and can move freely in the direction of axis X relatively with input shaft 21, as described above.

Each of the pair of cover disks 25A and 25B is formed like a disk whose diameter is determined for enabling insertion of the disk into cylindrical portion 23D of limiter cover 23, and on the peripheral side of each cover disk, projecting convex fitting portions 25C, which can be inserted into the concave fitting portions 29, are provided. The convex fitting portions 25C are fit to the concave fitting portions 29, by which the cover disks 25A and 25B are contained in limiter cover 23 such that these disks can rotate integrally with the limit cover 23 and can move freely in the direction of axis O.

In the arrangement of these cover disks 25A and 25B, one cover disk 25A is inserted between limiter plate 24 and limiter cover 23 so as to be in contact with bottom face 23C of the limiter cover, while the other cover disk 25B is disposed at the opening side of limiter cover 23 with respect to flange portion 24B of limiter plate 24, that is, as if flange portion 24B is placed between these cover disks 25A and 25B in the direction of axis O. Here, on the end faces (which face each other) of these cover disks 25A and 25B, disk-shaped facing materials 33 are respectively adhered in a form suitable for the contact state. The facing materials 33 may be formed by processing a mixture of a fiber material and a phenol resin (or the like) by using a compressive processing method. In addition, the facing materials 33 have a ring-shaped body whose cross-sectional shape is a rectangle, and on each face being in contact with flange portion 24B of limiter plate 24, four grooves 33a are provided in four radial directions, the depth of each groove being approximately half of the thickness of facing material 33. This groove 33a functions as an "escape" groove for abrasion particles. Here, facing material 33 is not divided by four grooves 33a, because in the present arrangement, integral shaping is possible and facing materials 33 are easily adhered to cover disks 25A and 25B.

In circular groove 28 formed at the opening side of limiter cover 23, C-ring 34 is placed, as a ring-shaped member in the present embodiment Furthermore, between this C-ring 34 and the above-mentioned other cover disk 25B disposed at the opening side of limiter cover 23, a coned disk spring is inserted in a compressed form, as forcing member 26 in the present embodiment.

As the C-ring 34 in the present embodiment, a snap ring, inserted into a hole, as specified in JIS Japanese Industrial Standard) B 2804, or a concentric snap ring, inserted into a hole, as specified in JIS B 2806, may be used. The inner diameter of the C-ring is smaller than the inner diameter of cylindrical portion 23D of limiter cover 23, as shown in FIG. 3. By putting such C-ring 34 into the above circular groove 28 in a form having a slightly reduced diameter, the C-ring is elastically forced toward "expanding" directions and is fixed inside limiter cover 23. On the other hand, the coned disk spring as forcing member 26 has a flat coned-disk form which can be loosely inserted inside the cylindrical portion 23D of limiter cover 23. In the insertion of the coned disk spring, the outer-peripheral edge of the disk spring is in contact with the C-ring 34, while the inner-peripheral edge of the disk spring is in contact with the other cover disk 25B. According to the pressing force based on the elasticity of the coned disk spring, cover disks 25A and 25B, and limiter plate 24 are forced to the bottom face 23C side of limiter cover 23.

In the power steering system comprising the above-constructed torque limiter 22, the forcing member 26 is supported inside the limiter cover 23 via C-ring 34 which is fit into circular groove 28 formed in the inner surface of limiter cover 23. In this arrangement, the outer diameter of torque limiter 22 does not exceed the outer diameter of limiter cover 23, in contrast to conventional power steering systems in which the forcing member is supported by a cover which covers the outer surface of the limiter cover. Therefore, in the present embodiment, the moment of inertia of the torque limiter 22 can be reduced, and accordingly, driving force necessary for rotationally driving output shaft 20 and input shaft 21 can be reduced. Simultaneously, follow-up capability between rotation of input shaft 21 and rotation of output shaft 20 can be realized and good response relating to the steering can be obtained during ordinary steering.

In the present embodiment, limiter cover 23 as the peripheral portion of torque limiter 22 is made of a light material such as aluminum, and concave fitting portions 29 being fit with convex fitting portions 25C of cover disks 25A and 25B are formed as passing through bottom plate 23A of limiter cover 23, by which the bottom plate 23A is lightened. Therefore, limiter cover 23 can be greatly lightened, and thus the moment of inertia of torque limiter 22 can be even further reduced. In addition, such a light material as aluminum is generally softer than a steel as a material used for output shaft 20 of driving unit 10 (such as a motor). Therefore, by forming limiter cover 23 using such a softer material, scuffing, abrasion, or the like, which may occur when larger-diameter portion 20A of output shaft 20 is pressed into mounting hole 23B of the limiter cover 23, can be prevented, and the press-fitting weight can be reduced, and thus the burden on bearing 19 and the like of driving unit 10 can be reduced.

On the other hand, the above circular groove 28, provided as a concave portion of the present embodiment, is directly formed in the inner surface of limiter cover 23; thus, the circular groove 28 can be accurately formed at a specified area in the limiter cover 23. In this case, (i) positional dispersion according to clamping conditions, or (ii) positional gaps according to, for example, deformation due to spring-back, does not occur, in contrast to the case of cover 6 of the above-mentioned conventional power steering system. In the present embodiment, forcing member 26 is held by such circular groove 28 via C-ring 34; thus, this forcing member 26 can be accurately positioned and supported in limiter cover 23.

Consequently, according to the present embodiment, force by forcing member 26 for pressing limiter plate 24 via cover disks 25A and 25B can be accurately defined to be a predetermined size; therefore, during ordinary steering, output shaft 20 and input shaft 21 can be stably rotated integrally by frictional force based on the above pressing force. If an impact force acts from the wheel side of the steering system, it is possible to reliably generate sliding between limiter plate 24 and cover disks 25A and 25B so as to absorb impact torque, and to prevent excessive torque from acting via limiter cover 23 on output shaft 20.

As explained above, C-ring 34 as a ring-shaped member is put into circular groove 28, and forcing member 26 is hung and supported via the C-ring 34, in the present embodiment. As another possible exemplary arrangement, plural projecting fitting portions which can be held at circular groove 28 may be provided in the peripheral edge of the coned disk spring as forcing member 26, so as to directly support the forcing member 26 by circular groove 28. In such an arrangement, C-ring 34 is unnecessary and thus necessary parts can be reduced.

However, in such a case in which fitting portions are formed in the forcing member 26 and the member 26 is directly supported by corresponding concave portions, slight differences in spring modulus may occur between an area where the fitting portion is formed and another area without the fitting portion of forcing member 26. Accordingly, pressing force by forcing member 26 may be partially non-uniform. In consideration of such a possibility, forcing member 26 is not directly held by circular groove 28 but is supported via C-ring 34 as a ring-shaped member in the present embodiment, by which occurrence of non-uniformity of pressing force as described above can be prevented and more stable forcing on limiter plate 24 can be realized.

Additionally, in the present embodiment, C-ring 34 such as a C-frame snap ring is used as a ring-shaped member, and this C-ring 34 is put into circular groove 28 formed in the inner surface of cylindrical portion 23D of limiter cover 23 at a slightly reduced size, and is forced toward "expanding" directions, and is fixed. Therefore, it is possible to firmly attach C-ring 34 inside limiter cover 23 by force for forcing this C-ring 34 toward its expanding directions and for pressing the C-ring 34 into circular groove 28. Consequently, according to the present embodiment, forcing member 26 can be further stably supported, by which the pressing force by this forcing member 26 can be further accurately defined and interruption between output shaft 20 and input shaft 21 can be further reliably performed. Here, as another example, instead of the above C-ring 34, a ring-shaped member having a disk shape which can be inserted into the above cylindrical portion 23D and having plural projecting fitting portions in the peripheral edge of the disk, which can be fit into the circular groove 28, may be used for supporting forcing member 26.

On the other hand, in the present embodiment, metal bush 31 is attached in limiter plate 24 which is rotated with input shaft 21 as a coaxial and integral form around axis X of the input shaft. Into this metal bush 31, the smaller-diameter portion 20B at the head side of output shaft 20 of driving unit 10, which projects from bottom face 23C of limiter cover 23, is inserted, by which limiter plate 24 is positioned coaxially with axis O of output shaft 20. As a result, according to the present embodiment, output shaft 20 and input shaft 21 are disposed via limiter plate 24 coaxially with respect to the axes 0 and X of each shaft, and thus coaxial conditions between output shaft 20 and input shaft 21 are established according to installation of torque limiter 22. That is, the alignment process for coaxialy arranging the output shaft 20 and input shaft 21 can be greatly simplified and high coaxial capability can be obtained.

As explained above, metal bush 31 is fixed to limiter plate 24 so as to insert output shaft 20 and to arrange output shaft 20 and input shaft 21 coaxially via the limiter plate 24, in the present embodiment However, instead of such an arrangement in which output shaft 20 and limiter plate 24 are coaxially coupled in a relatively rotatable form, coaxial capability may of course be established by an alignment process performed at the installation. In such a case, the larger-diameter 30A side of mounting hole 30 of limiter plate 24 is desirably closed for preventing grease (or the like) from being extruded into limiter cover 23.

On the other hand, in the present embodiment, a pair of cover disks 25A and 25B is disposed in limiter cover 23 in a manner such that the flange portion 24B of the limiter plate 24 is placed between these cover disks. In particular, by inserting and disposing cover disk 25A at the bottom face 23C side of limiter cover 23, necessary flatness with respect to the face at the bottom face 23C side, with which limiter plate 24 forced by forcing member 26 is contact, can be obtained, and uniform frictional force is generated according to the pressing force.

However, if sufficient flatness can be ensured for the bottom face 23C itself of limiter cover 23, then instead of the above arrangement, one of the cover disks, that is, cover disk 25A at the bottom face 23C side can be omitted. In this case, torque limiter 22 is lightened by the weight of cover disk 25A; thus, further reduction of the moment of inertia can be realized. However, if the other cover disk 25B, inserted between the flange portion 24B and the forcing member 26, is omitted, forcing member 26 is directly in contact with limiter plate 24. In this case, when sliding is generated between limiter plate 24 and limiter cover 23, pressing force is not uniform and then frictional force may become unstable and pressing force may be changed due to abrasion of forcing member 26. Therefore, this arrangement is undesirable.

Figure 4:
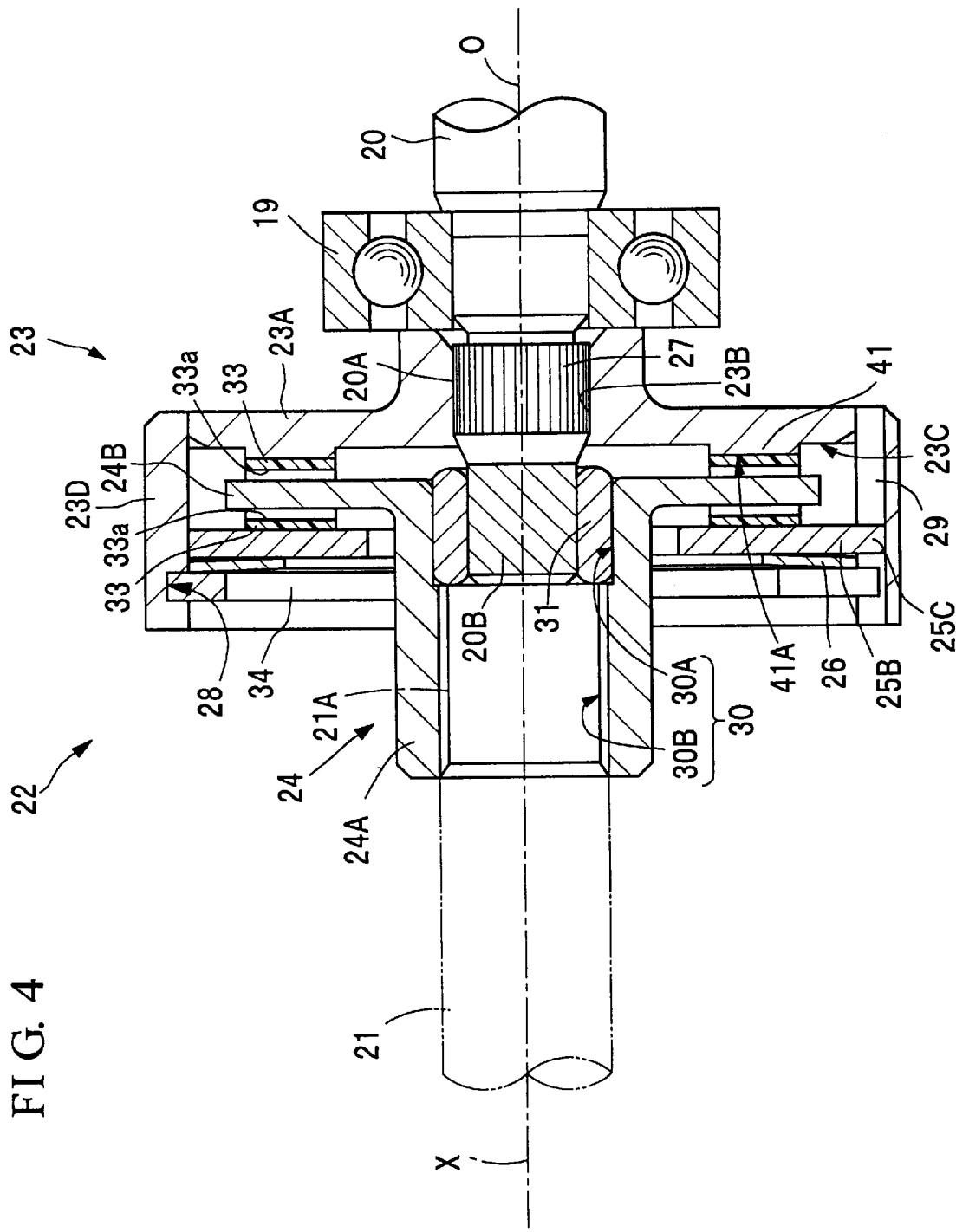
FIG. 4 is a sectional view showing torque limiter 22 of the second embodiment according to the present invention.

Even if cover disk 25A at the bottom face 23C side of limiter cover 23 is omitted as described above, a great deal of labor and time may be required for forming the entire bottom face 23C to have specified flatness, according to the size (or the like) of limiter cover 23. Such circumstances may cause inefficiency. Therefore, in such a case of omitting cover disk 25A, as in the second embodiment shown in FIG. 4 showing a sectional view of torque limiter 22, circular convex portion 41, projecting (in a step form) towards the opening side of limiter cover 23 from the bottom face 23C, may be formed, and facing material 33 may be adhered on the upper surface 41A of the convex portion 41 so that flange portion 24B of limiter plate 24 is in contact with the facing material. Here, in the second embodiment as shown in FIG. 4, parts identical to those in the first embodiment as shown in FIGS. 1–3 are given identical reference numerals, and explanations thereof are omitted.

According to the power steering system of the second embodiment as constructed above, flange portion 24B of limiter plate 24 forced by forcing member 26 is in contact with facing material 33 adhered on the upper surface 41A of the convex portion 41. Therefore, even though cover disk 25A is omitted at the bottom face 23C of limiter cover 23, it is only required that the upper surface 41A of the convex portion 41 is processed to have specific flatness. That is, in comparison with the entire bottom face 23C being similarly processed, time and labor can be reduced to improve efficiency, and limiter plate 24 and limiter cover 23 can be firmly in contact with each other and uniform frictional force can be generated.

It is also possible that, instead of providing convex portion 41 on the bottom face 23C of limiter cover 23, a facing material as mentioned above may be directly adhered on the bottom face 23C so as to make limiter plate 24 in contact with the upper surface of the facing material, by which similar effects can be obtained. A corresponding example will be explained later.

Furthermore, in the above first embodiment, facing materials 33 are adhered on the end faces (which face each other) of cover disks 25A and 25B. However, such facing materials may be adhered on the front and back faces of flange portion 24B of limiter plate 24, or such facing materials may be omitted if sufficient frictional force can be ensured between flange portion 24B and cover disks 25A and 25B, or between flange portion 24B and bottom face 23C of limiter cover 23 (in the case of the second embodiment).

On the other hand, in the present embodiment, concave fitting portions 29 are provided in the inner surface of cylindrical portion 23D of limiter cover 23, while projecting convex fitting portions 25C are provided in the peripheral edges of cover disks 25A and 25B, and by fitting the convex fitting portions 25C into the concave fitting portions 29, cover disks 25A and 25B are rotatable together with limiter cover 23 and can move freely in the direction of the center axis of limiter cover 23. However, fitting conditions between the cover disks 25A and 25B and limiter cover 23 are not limited to the above arrangement.

For example, in contrast, concave fitting portions may be provided in the peripheral edges of cover disks 25A and 25B, while projecting portions to which the above concave fitting portions can be fit may be provided in the inner surface of cylindrical portion 23A of limiter cover 23 in the above center-axis direction. As another example, the cross-sectional shape of the inner surface of the cylindrical portion 23D of limiter cover 23 may be a regular polygon and the planar shape of the cover disks 25A and 25B may have convex fitting portion(s) which are fit to one or more corners of the polygon. According to the former one among these arrangement, the wall thickness of the cylindrical portion 23D of limiter cover 23 can be thinner in comparison with the structure of the above embodiments; thus, the moment of inertia of torque limiter 22 can be even further reduced.

Figure 5:
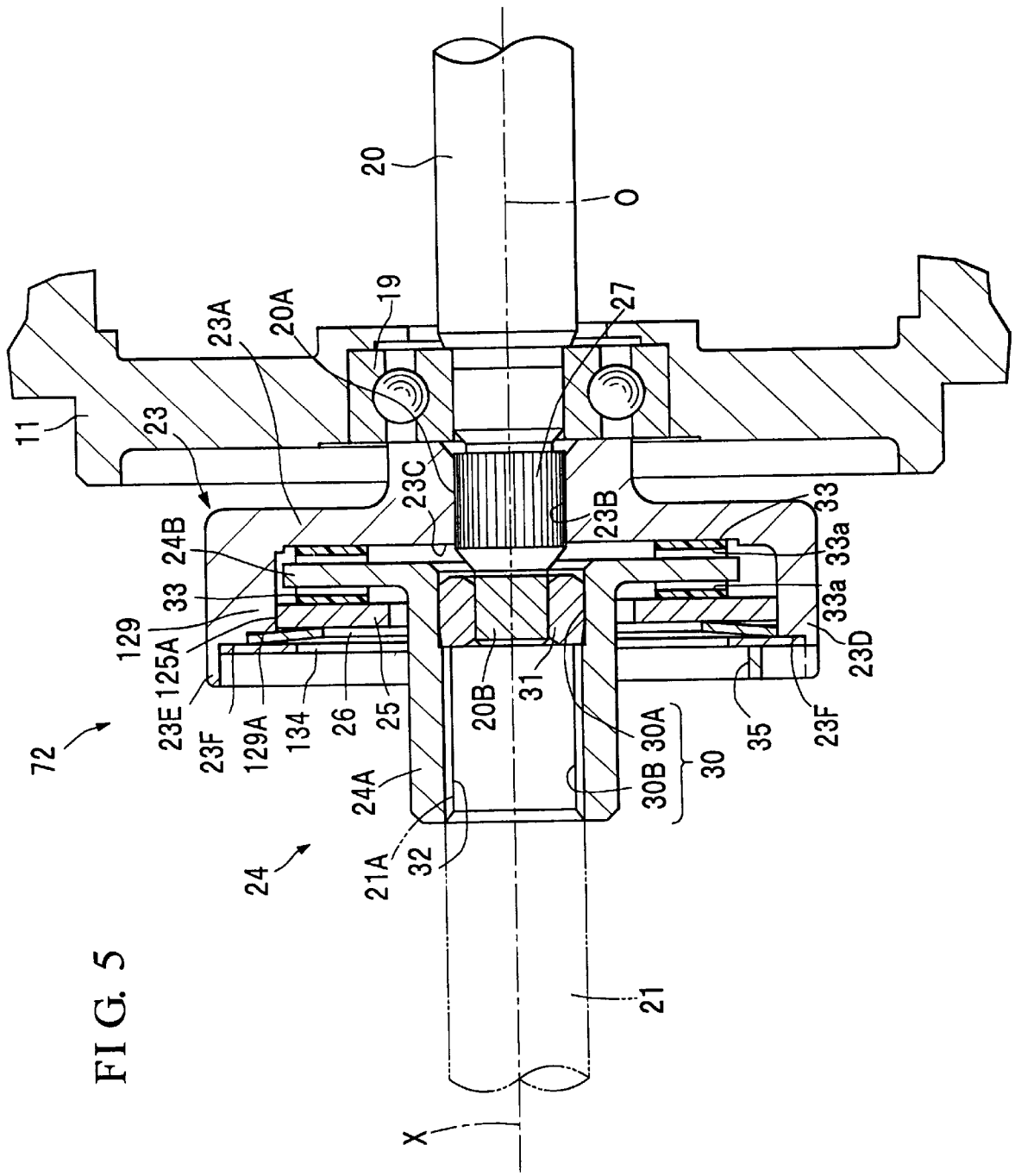
FIG. 5 is a sectional view (corresponding to "Z-O-Z" section in FIG. 6) showing torque limiter 72 of the third embodiment according to the present invention.
Figure 6:
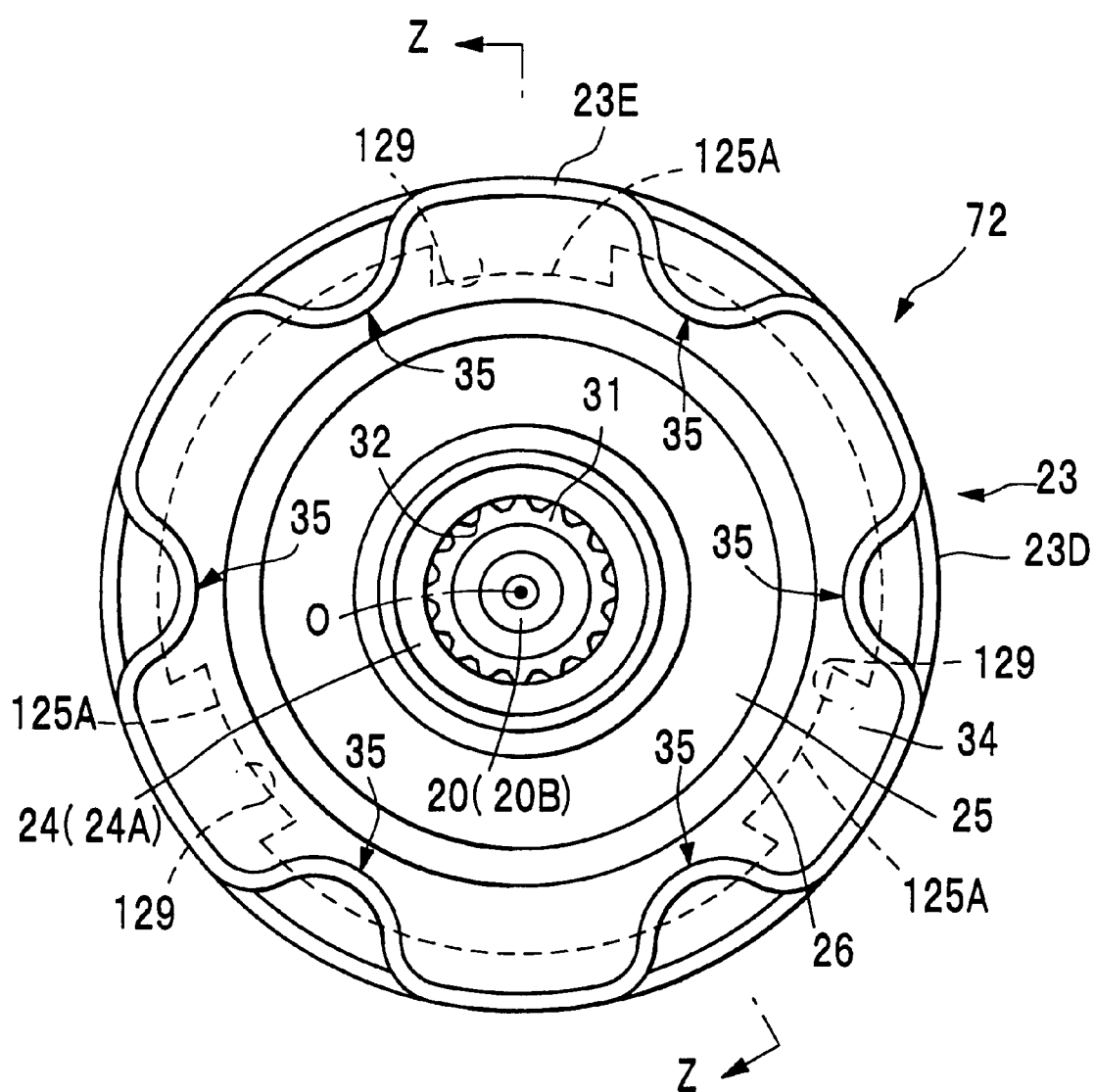
FIG. 6 is a front view of torque limiter 72 shown in FIG. 5, viewed from the input shaft 21 side.

FIGS. 5 and 6 show the arrangement of the third embodiment. In these figures, parts identical to those in FIGS. 1–4 are given identical reference numerals, and explanations thereof are omitted.

In torque limiter 72 of the present embodiment, limiter cover 23 itself is deformed so as to support forcing member 26, and only one cover disk 25 is provided between flange portion 24B and forcing member 26, as in the case of the above-explained second embodiment.

At the opening side of the cylindrical portion 23D of limiter cover 23, wall portion 23E is formed, in which the inner-peripheral area has two kinds of diameters and thus the larger diameter portion has a thinner wall thickness. In addition, step portion 23F is formed at the bottom face 23C side of the wall portion 23E. Furthermore, at some areas, closer to the bottom face 23C side than the step portion 23F, in the inner surface of cylindrical portion 23D, plural (three in the present embodiment) projecting portions as convex fitting portions 129 are formed as extending in parallel with the direction of the center axis of limiter cover 23, with equal spaces ensured in a circumferential line of the cylindrical portion 23D. End faces 129A of convex fitting portions 129, facing the above opening side, are formed at one-step receding positions toward the bottom face 23C side in comparison with the step portion 23F.

In addition, the above cover disk 25 is formed as a disk-like shape, which can be inserted and put into an area closer to the bottom face 23C side in comparison with the step portion 23F, and the area is positioned at the opening side of limiter cover 23 with respect to flange portion 24B of limiter plate 24, as described above. In the outer-peripheral edge of this cover disk 25, concave fitting portions 125A which can be fit into the above convex fitting portions 129 are formed. The concave fitting portions 125A are fit to the convex fitting portions 129, by which the cover disk 25 is disposed in limiter cover 23 such that the disk is rotatable together with limiter cover 23 and can move freely in the direction of the center axis of limiter cover 23.

On the bottom face 23C of limiter cover 23 and on the end face of cover disk 25, which faces flange portion 24B, facing materials 33, having grooves 33a which function as "escape" grooves for abrasion particles, are respectively adhered as in the first and second embodiments. In the present embodiment, no convex portion is formed in bottom face 23C of limiter cover 23, in contrast to the second embodiment, and a facing material is directly adhered on bottom face 23C and limiter plate 24 is in contact with the upper surface of the facing material.

At an area closer to the opening side of limiter cover 23 than the cover disk 25, a coned disk spring is inserted in a compressed form, as forcing member 26 in the present embodiment One side of forcing member 26 nearer to the above opening side is supported via plate 134 by plural projecting portions 35 which are formed by deforming the cylindrical portion 23D of limiter cover 23 toward the inside. In more detail, these projecting portions 35 are formed by shearing a part of wall portion 23E at the opening side of cylindrical portion 23D of limiter cover 23 in a radial direction for a predetermined width along a circumferential line and simultaneously pressing the above part toward the inside, in order to deform the part so as to stretch the corresponding wall to have a curved and angular form. In the present embodiment, six projecting portions 35 are separately positioned with equal spaces in a circumferential line in the cylindrical portion 23D.

The position of each end face of the projecting portions 35, which face the bottom face 23C side of limiter cover 23, that is, each position where a part of wall portion 23E is sheared in a radial direction, are defined such that a space corresponding to the thickness of the plate 134 is left between the above position and the position where step portion 23F is formed inside of cylindrical portion 23D. In addition, the shape of plate 134 is like a disk having an outer diameter by which the disk can be inserted inside the wall portion 23E, and the plate 134 is disposed between the above projecting portions 35 and the step portion 23F. The coned disk spring used as forcing member 26 has a flat and coned-disk shape, and can be inserted into the inner-peripheral area of step portion 23F of cylindrical portion 23D. This coned disk spring is disposed between the plate 134 and the above end faces 129A of convex fitting portions 129 which are formed at one-step receding positions from the step portion 23F, and the outer-peripheral edge of the disk spring is in contact with the plate 134, while the inner-peripheral edge thereof is in contact with the cover disk 25. In such an arrangement, by the pressing force based on the elasticity of the coned disk spring, cover disk 25 and limiter plate 24 are forced toward the bottom face 23C side. Here, end faces 129A of the above convex fitting portions 129 are formed where the faces did not interfere with forcing member 26.

In order to form the above projecting portions 35 in cylindrical portion 23D of limiter cover 23, a pressing tool comprising a shear edge integrally attached at the head of the tool may be used. That is, this exemplary pressing tool has a prismatic shape in which the head face has a cylindrical or coned face, and the above shear edge is provided on the head face. The limiter plate 24, cover disk 25, forcing member 26, and plate 134 are contained in limiter cover 23, and then the plate 134 is pressed onto the bottom face 23C side of limiter cover 23 so as to make plate 134 contact with the step portion 23F, by which forcing member 26 is positioned in a compressed state. Under these conditions, the above shear edge is positioned in the direction of the center axis of limiter plate 24 and in a coplaner state with a side face of plate 134, which faces the above opening side, and the head face of the above pressing tool is placed to face the outer surface of the wall portion 23E of limiter cover 23.

Then, by making the pressing tool project toward the inside in a radial direction with respect to the center axis, a predetermined width along a circumferential line of the wall portion 23E is sheared in a radial direction, and simultaneously, the portion between the sheared plane and the opening end of cylindrical portion 23D of limiter cover 23 is pressed by the above head face of the pressing tool toward the inside in the radial direction, and thereby projects. As a result, the above-mentioned curved and angular projecting portion 35 is formed, and plate 134 is inserted between the projecting portions 35 and the above step portion 23F and forcing member 26 is supported. Therefore, by using such a pressing tool, the projecting portion 35 can be formed in a single step. In order to form such projecting portions 35 at separate positions in a circumferential line of limiter cover 23 as in the present embodiment, the projecting portions 35 may be formed in turn by using a single pressing tool, or many pressing tools corresponding to the number of projecting portions 35 may be radially arranged around limiter cover 23 so as to form plural projecting portions 35 in a single step.

In the power steering system of the present embodiment comprising torque limiter 72 as constructed above, the above forcing member 26 is supported via plate 134 by projecting portions 35 which are formed by deforming cylindrical portion 23D of limiter cover 23 itself toward the inside; thus, the outer diameter of torque limiter 72 does not exceed the outer diameter of limiter cover 23, in contrast to the conventional power steering system in which a forcing member is supported by a cover which covers the outer surface of the limiter cover 23. In addition, by forming projecting portions 35 by deforming cylindrical portion 23D of limiter cover 23 toward the inside, as mentioned above, some of the weight of cylindrical portion 23D is concentrated at the inner-peripheral side by the weight of the projecting portions 35, and thus the moment of inertia is reduced. Therefore, according to the present embodiment having the above features, the moment of inertia of the torque limiter 72 can be generally reduced, by which driving force for rotationally driving output shaft 20 and input shaft 21 can be reduced and at ordinary steering, rapid follow-up between rotation of input shaft 21 and rotation of output shaft 20 can be realized and good steering response can be obtained.

Also in the present embodiment, the above limiter cover 23 as an outer-peripheral area of torque limiter 72 is made of a light material such as aluminum as in the first embodiment, and thus the weight of limiter cover 23 is greatly reduced. Therefore, also for this reason, the moment of inertia of torque limiter 72 can be reduced and scuffing, abrasion, or the like, which may occur when larger-diameter portion 20A of output shaft 20 is pressed into mounting hole 23B of the limiter cover 23 can be prevented, and the press-fitting weight can be reduced, thus reducing the burden on bearing 19 and the like of driving unit 10.

Figure 7:
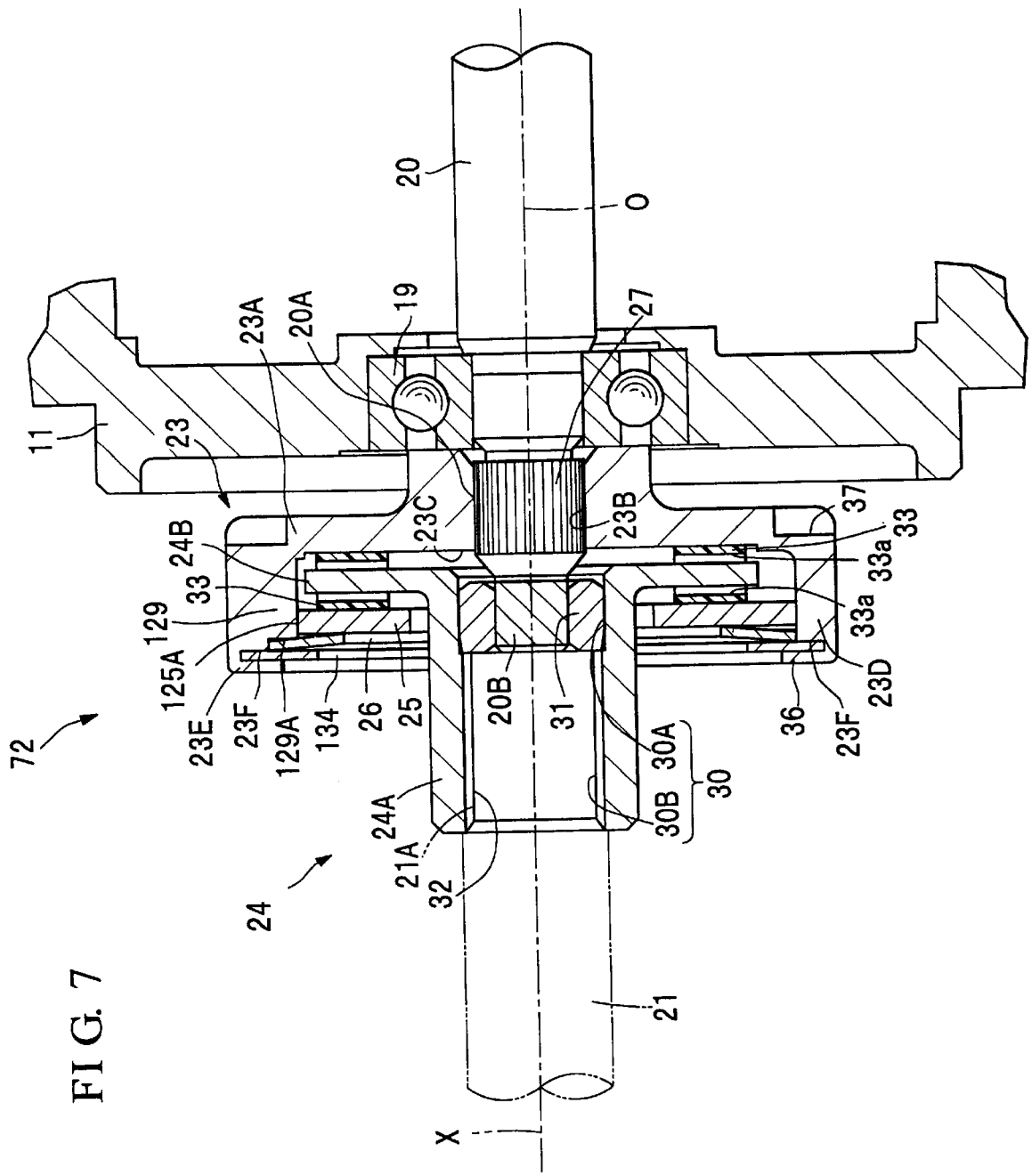
FIG. 7 is a sectional view showing torque limiter 72 of the fourth embodiment according to the present invention.

On the other hand, in the third embodiment, the above-mentioned projecting portions 35 are formed by radially shearing a part of cylindrical portion 23D of limiter cover 23 along a circumferential line, as explained above. However, for only supporting the coned disk spring as forcing member 26, as in the fourth embodiment according to the present invention shown in FIG. 7, projecting portion 36 may be formed by rolling up and clamping the wall portion 23E formed at the opening side of cylindrical portion 23D of the limiter cover 23 by folding the wall portion toward the inside, and forcing member 26 may be supported such that plate 134 is placed between the above projecting portion 36 and step portion 23F of cylindrical portion 23D. Here, in the fourth embodiment as shown in FIG. 7, parts identical to those in the third embodiment are given identical reference numerals, and explanations thereof are omitted. In addition, the portion indicated by reference numeral 37 in FIG. 7 of the fourth embodiment is a concave portion, formed in the peripheral edge of bottom plate 23A of limiter cover 23, for inserting a tool for receiving pressure acting in the direction of the center axis of limiter cover 23 at the folding and clamping of the wall portion 23E toward the inside.

Also in the fourth embodiment in which projecting portion 36 is formed by clamping cylindrical portion 23D of limiter cover 23, an additional cover or the like is unnecessary outside limiter cover 23; thus, the first objective of the present invention, i.e., reduction of the moment of inertia of torque limiter 72, can be realized. Additionally, in the fourth embodiment, concave portion 37 is provided in the peripheral edge of bottom plate 23A of limiter cover 23, by which the weight of the peripheral area of limiter cover 23 is reduced, and thus the moment of inertia of torque limiter 72 can be further reduced.

The formation of the above-described projecting portion 36 by deforming the cylindrical portion 23D of limiter cover 23 by folding the portion toward the inside includes both deformation of limiter cover 23 in its radial directions and bending of the limiter cover 23 in its center axis direction. Therefore, as in the conventional case in which the opening portion of the cover which covers the outer surface of a conventional limiter cover is clamped, the position where forcing member 26 is supported may be shifted according to conditions of the clamping, or the projecting portion bent in the center-axis direction may have spring-back and accordingly the support of forcing member 26 may be unstable. In contrast, in the above fourth embodiment, concave portion 37 is formed in bottom plate 23A as explained above, and a tool for receiving pressing force in the center-axis direction generated at the clamping is inserted in the concave portion 37, by which clamping conditions are prevented from becoming unstable. However, even in this case, it is impossible to completely prevent spring-back due to bending of the projecting portion 36 in the center-axis direction at the time of clamping, although such spring-back can be adequately suppressed.

In contrast, in the third embodiment, the projecting portion 35 is formed by shearing a part of cylindrical portion 23D of limiter cover 23 in a radial direction and deforming the corresponding part toward the inside, as described above; that is, this projecting portion 35 can be formed by deforming it not in the direction of the center axis of limiter cover 23 but only in a radial direction. Therefore, by accurately determining a position to be sheared in the limiter cover 23 by using a pressing tool as described above, the projecting portion 35 can also be accurately positioned, and consequently, shifting of the position where forcing member 26 is supported can of course be prevented. In addition, by forming the projecting portion 35 via deformation of cylindrical portion 23D only in a radial direction, as described above, even though spring-back is generated at this projecting portion 35, the projecting portion 35 is only deformed toward the outer-peripheral side in a radial direction. Accordingly, it is possible to certainly prevent shifting of the position, where forcing member 26 is supported in the direction of the center axis of limiter cover 23, due to the spring-back.

Therefore, according to the third embodiment, the force by forcing member 26 for pressing limiter plate 24 via cover disk 25 can be accurately set to be a predetermined size; thus, at ordinary steering, output shaft 20 and input shaft 21 can be stably rotated integrally due to the friction resulting from the pressing force. If an impact force acts from the wheel side of the steering system, it is possible to reliably generate sliding between limiter plate 24 and cover disk 25 so as to absorb impact torque, and to prevent excessive torque from acting via limiter cover 23 on output shaft 20.

Figure 8:
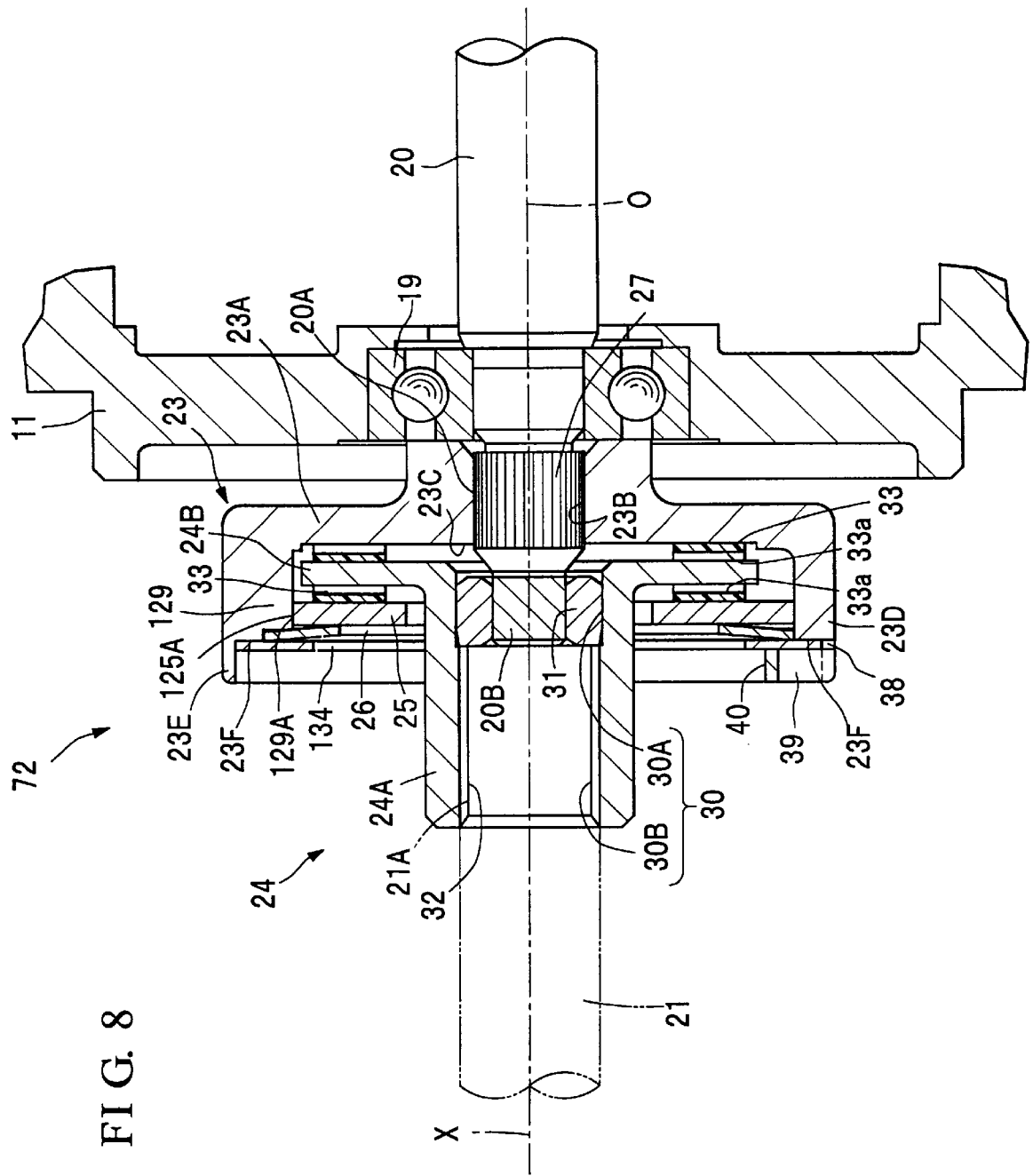
FIG. 8 is a sectional view showing torque limiter 72 of the fifth embodiment according to the present invention.

Additionally, in the third embodiment, projecting portion 35 is formed by shearing a portion of cylindrical portion 23D of limiter cover 23 and deforming the corresponding portion toward the inside, as described above. However, as in the fifth embodiment of the present invention shown in FIG. 8, projecting portion 40 may be formed in a manner such that cut 38 of a predetermined width is formed in wall portion 23E of cylindrical portion 23D of limiter cover 23 as extending in a circumferential line of the wall portion 23E and flexible portion 39 having an arc-board shape is formed between the cut 38 and the opening end of cylindrical portion 23D, and then this flexible portion 39 is deformed toward the inside in a radial direction of limiter cover 23. Here, also in the fifth embodiment as shown in FIG. 8, parts identical to those of the third embodiment are given identical reference numerals.

Also in the power steering system of the fifth embodiment, the moment of inertia of torque limiter 72 can of course be reduced as in the third and fourth embodiments, and furthermore, the projecting portion 40 is formed by deforming the flexible portion 39 (which was formed via cut 38) toward the inside in a radial direction of limiter cover 23; thus, by accurately forming the cut 38, shifting of the position where forcing member 26 is supported can be prevented as in the third embodiment and the projecting portion 40 can be formed by deforming the flexible portion 39 only in a radial direction, by which it is possible to certainly prevent the spring-back which leads to unstable support of forcing member 26. Also in the fifth embodiment, by forming the above cut 38 in limiter cover 23, the weight of the outer-peripheral side of the limiter cover 23 is slightly reduced; thus, the moment of inertia of torque limiter 72 can be even further reduced.

On the other hand, in the third or fifth embodiment, projecting portion 35 or 40 is formed (i) by radially shearing a portion in a circumferential line of cylindrical portion 23D of limiter cover 23 and deforming the corresponding portion toward the inside, or (ii) by deforming flexible portion 39 which is provided by forming cut 38 in a circumferential line of the cylindrical portion 23D. Therefore, when plural projecting portions 35 or 40 are formed in order to support forcing member 26 such as a coned disk spring in the entire circumferential area, these projecting portions 35 or 40 are formed at separate positions in a circumferential line of limiter cover 23, so that a sheared plane by the shearing or cut 38 does not extend into the next plane or cut. In the above third or fifth embodiment, disk-shaped plate 134 is placed between the projecting portions 35 or 40 and the coned disk spring as forcing member 26. However, such a plate 134 may be omitted, and forcing member 26 may be in direct contact with the projecting portions 35 or 40 so as to support the disk spring. In this case, plate 134 is unnecessary; thus, the number of parts necessary for torque limiter 72 can be reduced.

However, in the above case in which the forcing member 26 as a coned disk spring is directly in contact with and supported by separate projecting portions 35 or 40 existing in a circumferential line of limiter cover 23, an area in contact with the projecting portions 35 or 40 and another area which is not in contact with such projecting portions in forcing member 26 have different mounting stiffness values; thus, stable support conditions for forcing member 26 may be spoiled. Therefore, in these embodiments, the forcing member 26 is not directly supported by projecting portions 35 or 40, but disk-shaped plate 134 is instead placed between the forcing member 26 and the projecting portions so as to support the coned disk spring as forcing member 26 being in contact with this plate 134 through the whole circumferential line. In this way, it is possible to prevent mounting stiffness of forcing member 26 from becoming non-uniform and to further stably support forcing member 26 so as to force plate 134.

Also in the fourth embodiment, as shown in FIG. 7, plate 134 is placed between projecting portion 36, which is formed by rolling up and clamping cylindrical portion 23D of limiter cover 23 and by deforming the relevant part toward the inside, and forcing member 26. According to such insertion of plate 134, this fourth embodiment has the following advantage in contrast with a case in which forcing member 26 is directly in contact with projecting portion 36 without plate 134. That is, if sliding is generated between limiter cover 23 and limiter plate 24, it is possible to avoid a case in which the clamped projecting portion 36 functions as a slide plane and leads to unstable frictional force by forcing member 26. Additionally, in this fourth embodiment, by inserting plate 134 as explained above, even though an error due to clamping conditions is generated in formation of projecting portion 36, forcing member 26 can be further stably supported using the planar face of plate 134.

Furthermore, in the above third to fifth embodiments, a second cover disk, on one end face of which a facing material (as mentioned above) is adhered, may be disposed between flange portion 24B of limiter plate 24 and bottom face 23C of limiter cover 23, as in the first embodiment. In this case, it is possible to ensure necessary flatness for the face with which limiter plate 24 is contact, with respect to the bottom face 23C side of limiter cover 23. Therefore, frictional force generated by pressing force of forcing member 26 can be made more stable.

Here, if specific flatness can be provided to bottom face 23C itself in limiter cover 23, it is possible, without inserting such a second cover disk, to directly force limiter plate 24 onto bottom face 23C of limiter cover 23, as in the third to fifth embodiments. In this way, the weight of torque limiter 72 is reduced by the weight corresponding to the above second cover disk; thus, increase of the moment of inertia can be prevented. On the other hand, if cover disk 25 inserted between flange portion 24B and forcing member 26 is omitted, forcing member 26 is directly in contact with limiter plate 24. Such an arrangement is undesirable because if sliding is generated between the limiter plate 24 and the limiter cover 23, frictional force may become unstable due to non-uniform pressing force, or the pressing force may change due to abrasion of forcing member 26.

Even though such a second cover disk is not inserted at the bottom face 23C side of limiter cover 23 and limiter plate 24 is directly supported by providing specific. flatness to bottom face 23C, a great deal of time and labor may be necessary for providing specific flatness to the entire bottom face 23C, this being dependent on the size or the like of limiter cover 23, which may lead to inefficiency. Therefore, in such a case, as in the sixth embodiment according to the present invention, as in the sectional view of torque limiter 72 shown in FIG. 9, circular projecting portion 41 may be formed on bottom face 23C of limiter cover 23, the portion 41 projecting one step toward the opening side of limiter cover 23 with respect to the bottom face 23C, and on the upper face 41A of portion 41, facing material 33 is adhered so as to place flange portion 24B of limiter plate 24 in contact therewith. This projecting portion 41 is similar to that provided in the second embodiment as shown in FIG. 4. Also in this sixth embodiment, parts identical to those in the third embodiment are given identical reference numerals and explanations thereof are omitted.

According to the power steering system of the sixth embodiment as constituted above, flange portion 24B of limiter plate 24, forced by forcing member 26, is in contact with facing material 33 adhered on the upper surface 41A of the above projecting portion 41; thus, only the upper surface 41A of the projecting portion 41 must be processed to have specific flatness. Therefore, in comparison with processing of the entire bottom face 23C of limiter cover 23, time and labor can be saved and processing efficiency can be improved. In addition, limiter plate 24 and limiter cover 23 can be securely in contact with each other, and uniform frictional force can be generated, without inserting the second cover disk as described above.

Furthermore, in the third to fifth embodiments, facing materials 33 are respectively adhered on bottom face 23C of limiter cover 23 and one end face of cover disk 25 which faces the bottom face 23C side, while in the sixth embodiment, facing materials 33 are adhered on the upper surface 41A of projecting portion 41 and the end face of cover disk 25. However, such facing materials 33 may be adhered on front and back faces of flange portion 24B of limiter plate 24; alternatively, if sufficient frictional force can be ensured between flange portion 24B and cover disk 25 and bottom face 23C of limiter cover 23, or between flange portion 24B and upper surface 41A of projecting portion 41 in the sixth embodiment, or between the flange portion 24B and a second cover disk, then facing material may be unnecessary between such members.

In addition, in the first to sixth embodiments, limiter cover 23 of torque limiter 22 or 72 is attached to output shaft 20 of driving unit 10 integrally, and simultaneously, limiter plate 24 is attached to input shaft 21 of the steering system so as to make them integrally rotatable. However, in contrast to such an arrangement, limiter plate 24 may be attached to output shaft 20 while limiter cover 23 may be attached to input shaft 21 integrally in each attachment.

In the third to sixth embodiments, convex fitting portions 129 are formed in the inner surface of cylindrical portion 23D of limiter cover 23, while concave fitting portions 125A are formed in the peripheral surface of cover disk 25, and by fitting these concave fitting portions 125A into the convex fitting portions 129, cover disk 25 can be rotated together with limiter cover 23, and simultaneously, can freely and relatively move with respect to the center-axis direction of limiter cover 23. According to such an arrangement, the wall thickness of the portions other than the above convex fitting portions 129 can be reduced in cylindrical portion 23D of limiter cover 23; thus, the moment of inertia of torque limiter 72 can be even further reduced.

As in the first and second embodiments, the cross-sectional shape of the inner surface of the cylindrical portion 23D of limiter cover 23 may be a regular polygon and the planar shape of cover disk 25 may have convex fitting portion(s) which are fit to one or more corners of the polygon.

Figure 10:
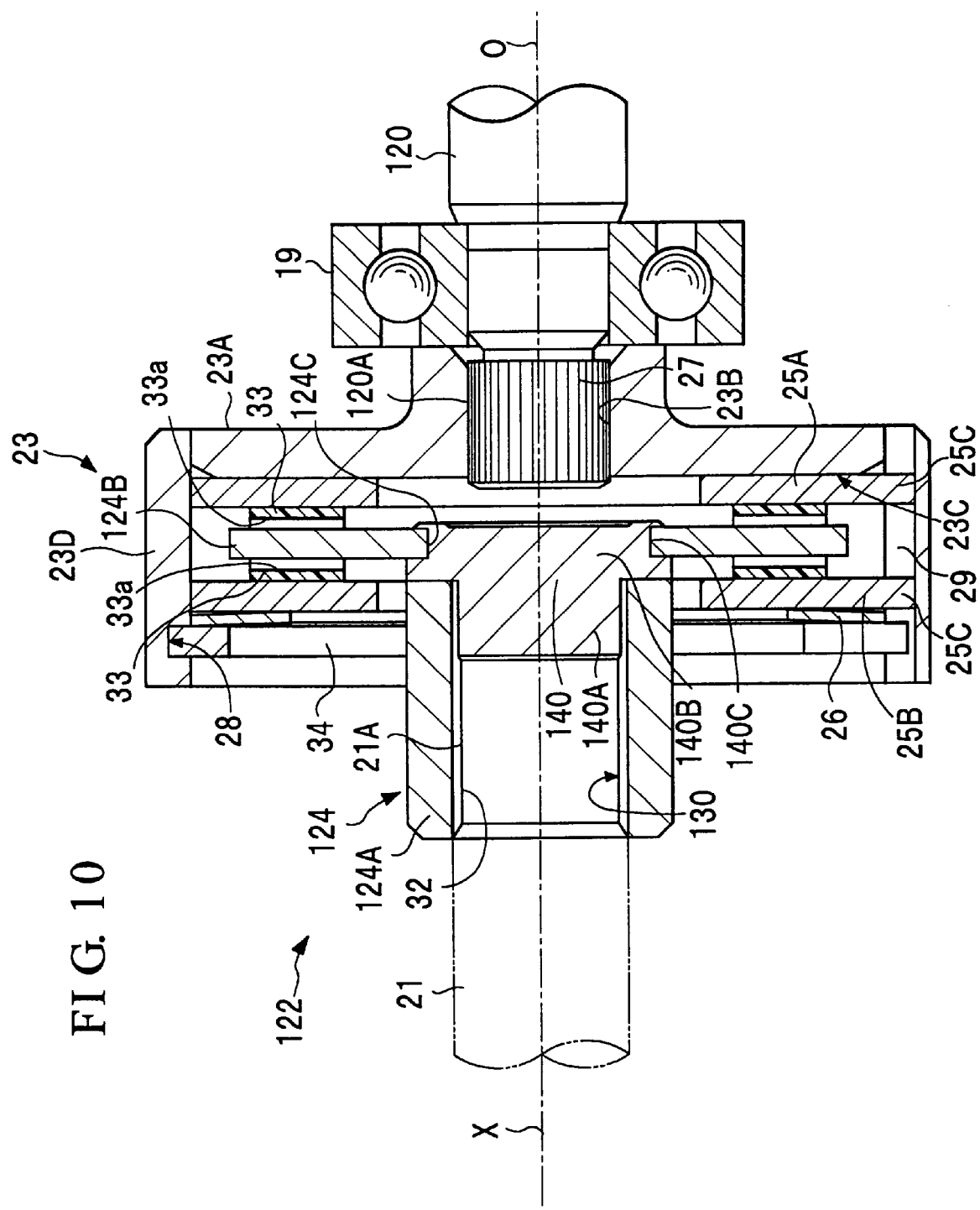
FIG. 10 is a sectional view showing torque limiter 122 of the seventh embodiment according to the present invention.

FIG. 10 is a sectional view showing the torque limiter (122) of the power steering system of the seventh embodiment according to the present invention. This torque limiter has a partially improved structure relating to the first embodiment as shown in the above FIGS. 1–3, and parts identical to those in FIGS. 1–3 are given identical reference numerals and explanations thereof are omitted.

In the present embodiment, instead of limiter plate 24 as shown in FIG. 2, limiter plate 124 is provided. As explained above, limiter plate 24 has an integral structure in which disk-shaped flange portion 24B is formed at one side of cylindrical mounting portion 24A. However, limiter plate 124 in the present embodiment has a different structure in which cylindrical portion 124A which corresponds to the cylindrical mounting portion 24A and disk-shaped flange portion 124B which corresponds to flange portion 24B are coupled via bush 140.

The bush 140 consists of smaller-diameter portion 140A which is pressed inside cylindrical portion 124A and larger-diameter portion 140B which is combined with flange portion 124B. In the larger-diameter portion 140B, circular fitting portion 140C is formed with respect to the center axis of cylindrical portion 124A (in FIG. 10, this center axis agrees with center axis X).

Mounting hole 124C is made at a center portion of flange portion 124B so as to attach the flange portion to bush 140, and on the inner-peripheral area (corresponding to the inner diameter) of this hole, concave-convex splines are provided in order to maintain firmly coupling conditions between the flange portion 124B and bush 140.

Figure 11:
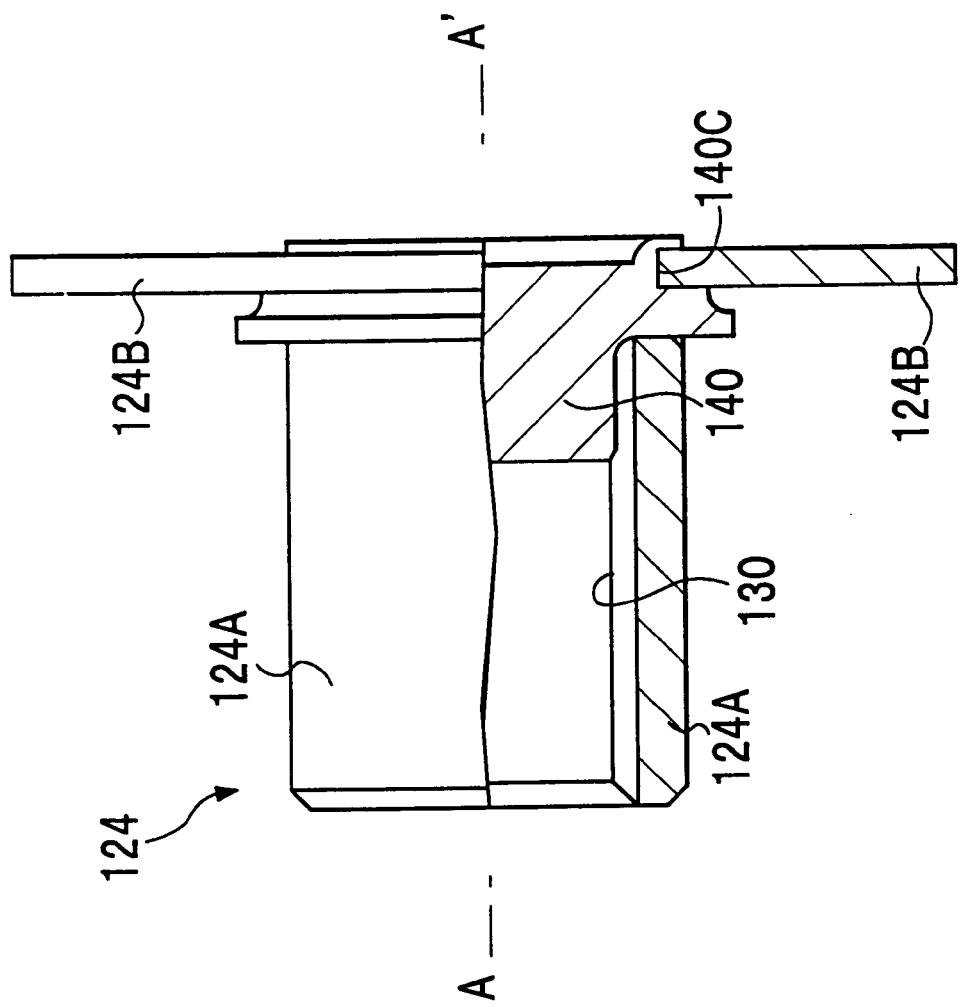
FIG. 11 is a partially-sectional side view showing the limiter plate of the torque limiter in FIG. 10.

The assembling process is as follows: bush 140 as a "cap" is damped to the above mounting hole 124C of flange portion 124B in a manner such that the edge of the flange portion 124B at the hole 124C side is fit in the circular fitting portion 140C, and then the bush 140 is pressed and fixed into cylindrical portion 124A. FIG. 11 is a partially-sectional side view showing the conditions of limiter plate 124 after the pressing operation, and the upper half from the alternating long and short dash line A–A' is a side view, while the lower half of the line is a sectional view.

Here, on the inner-peripheral surface 130 of cylindrical portion 124A, multiple spline grooves 32 extending in parallel with the center-axis of limiter plate 124, that is, with axis O, are formed with equal spaces secured in a circumferential line. On the other hand, at the end portion of input shaft 21, multiple splines 21A, which extend in parallel with axis X of input shaft 21 and which can be engaged with the spline grooves 32, are provided. By inserting input shaft 21 into cylindrical portion 124A with the splines 21A as being engaged in spline grooves 32, the limiter plate 124 is coaxially attached to input shaft 21 such that the plate 124 can be rotated together with shaft 21 around its axis X and can also freely move in the X direction relative to the input shaft 21, as described above.

In the above arrangement, limiter plate 124 as a rotated member of the present invention is forced onto the bottom plate side of limiter cover 23 as a rotating member of the present invention.

Here, in the first embodiment as shown in FIGS. 1 and 2, output shaft 20 has a step-form structure in which the front portion of output shaft 20, which projects from bracket 11 of driving unit 10, has two kinds of diameters and the diameter at the head side is smaller than that of the remaining portion. However, in output shaft 120 in the present embodiment, only portion 120A corresponding to the larger-diameter portion 20A projects from the bracket, so as to fit the shaft with limiter plate 124 having the above-mentioned structure.

In the limiter plate of the present embodiment, a cylindrical portion, on the inner-peripheral area of which splines are provided, and a flange portion for which sufficient planar accuracy is required so as to function as a friction clutch, are separately formed as described above. Therefore, efficient formation in fill consideration of accuracy required for each portion can be realized. In addition, both these portions can be formed using different materials, for example, (i) using a cylindrical piece of ferrous material, the center hole part of which was subjected to a cutting process, for cylindrical portion 124A for which better accuracy and strength are required, and (ii) using a material by which stable frictional force can be generated, such as flat stainless steel which is subjected to a punching process, for flange portion 124B. Accordingly, more flexible design is possible, in other words, the limiter plate can be manufactured under conditions advantageous for efficient formation.

Figure 12:
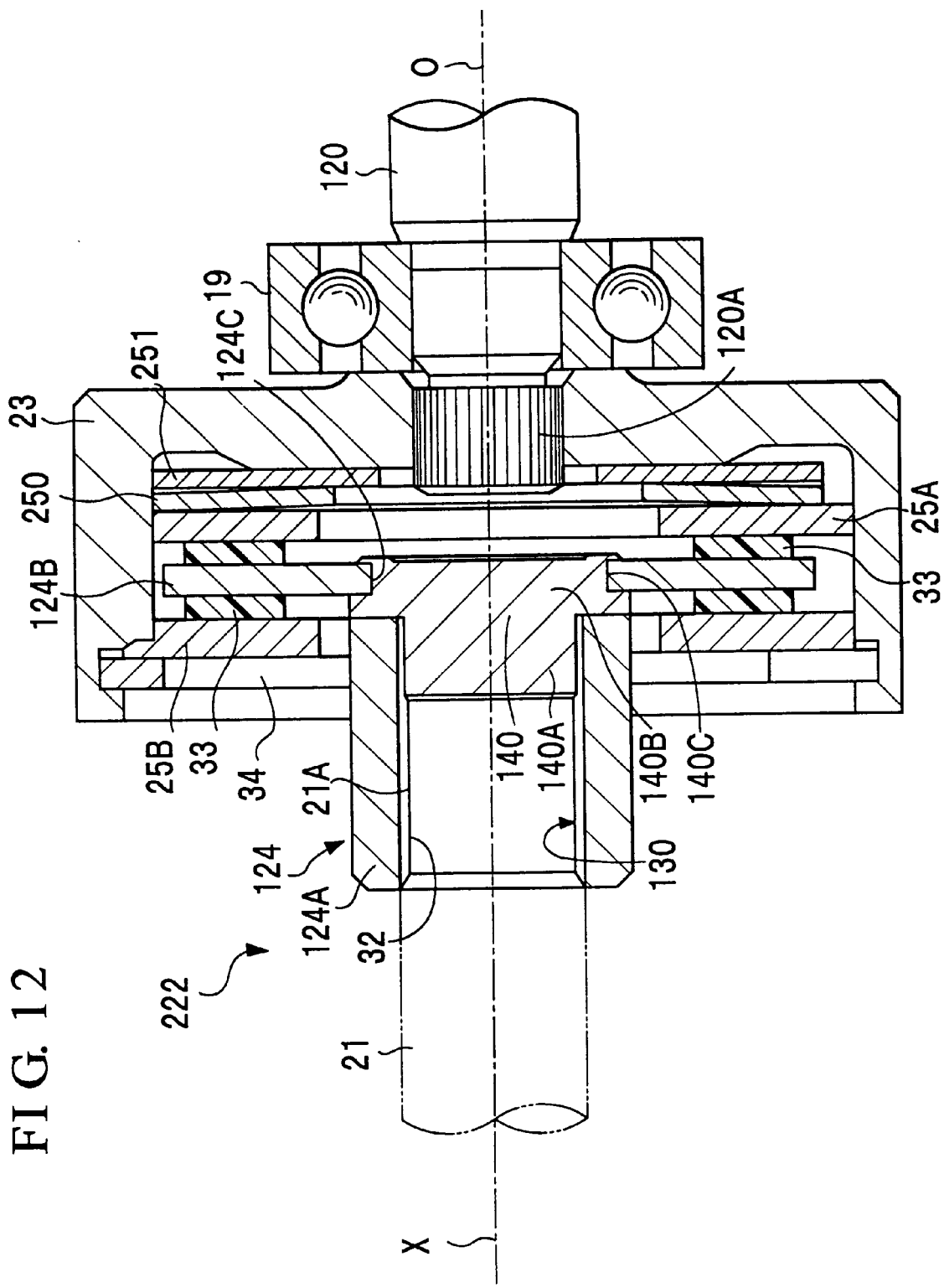
FIG. 12 is a sectional view showing torque limiter 222 of the eighth embodiment according to the present invention.

FIG. 12 is a sectional view showing the torque limiter (222) of the power steering system of the eighth embodiment according to the present invention. In the figure, parts identical to those in FIG. 10 are given identical reference numerals, and explanations thereof are omitted.

The basic structure of the present embodiment is similar to the seventh embodiment as shown in FIG. 10, and includes the same limiter plate 124. However, another possible arrangement is adopted in the mechanism for forcing this limiter plate to the bottom plate side of limiter cover 23, that is, instead of forcing member (coned disk spring) 26 provided next to C-ring 34, coned disk spring 250 and washer 251 are provided at a position in contact with the bottom plate of the limiter cover.

Figure 13:
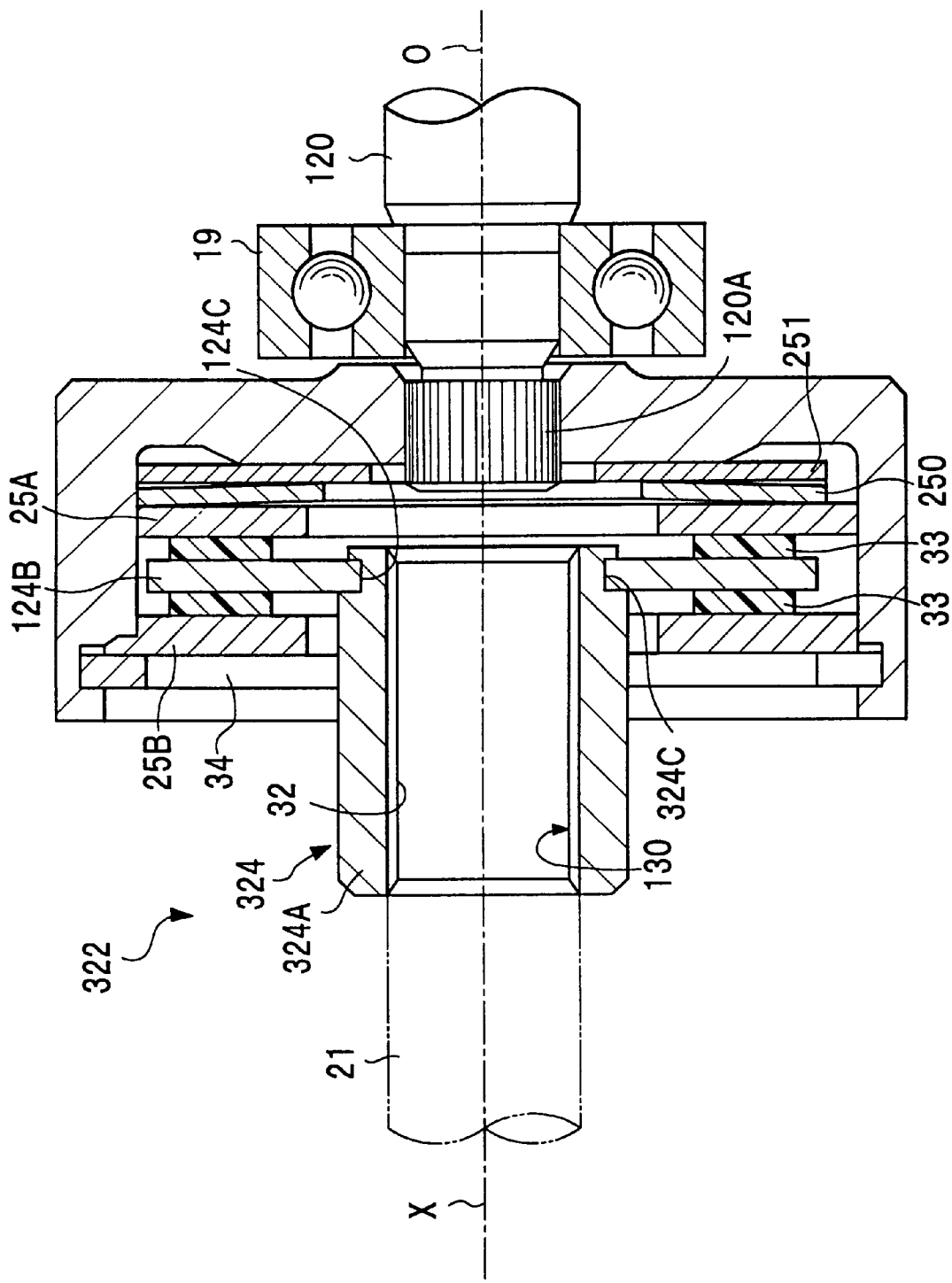
FIG. 13 is a sectional view showing torque limiter 322 of the ninth embodiment according to the present invention.

FIG. 13 is a sectional view showing the torque limiter (322) of the power steering system of the ninth embodiment according to the present invention. In the figure, parts identical to those in FIGS. 10 and 12 are given identical reference numerals, and explanations thereof are omitted.

Figure 9:
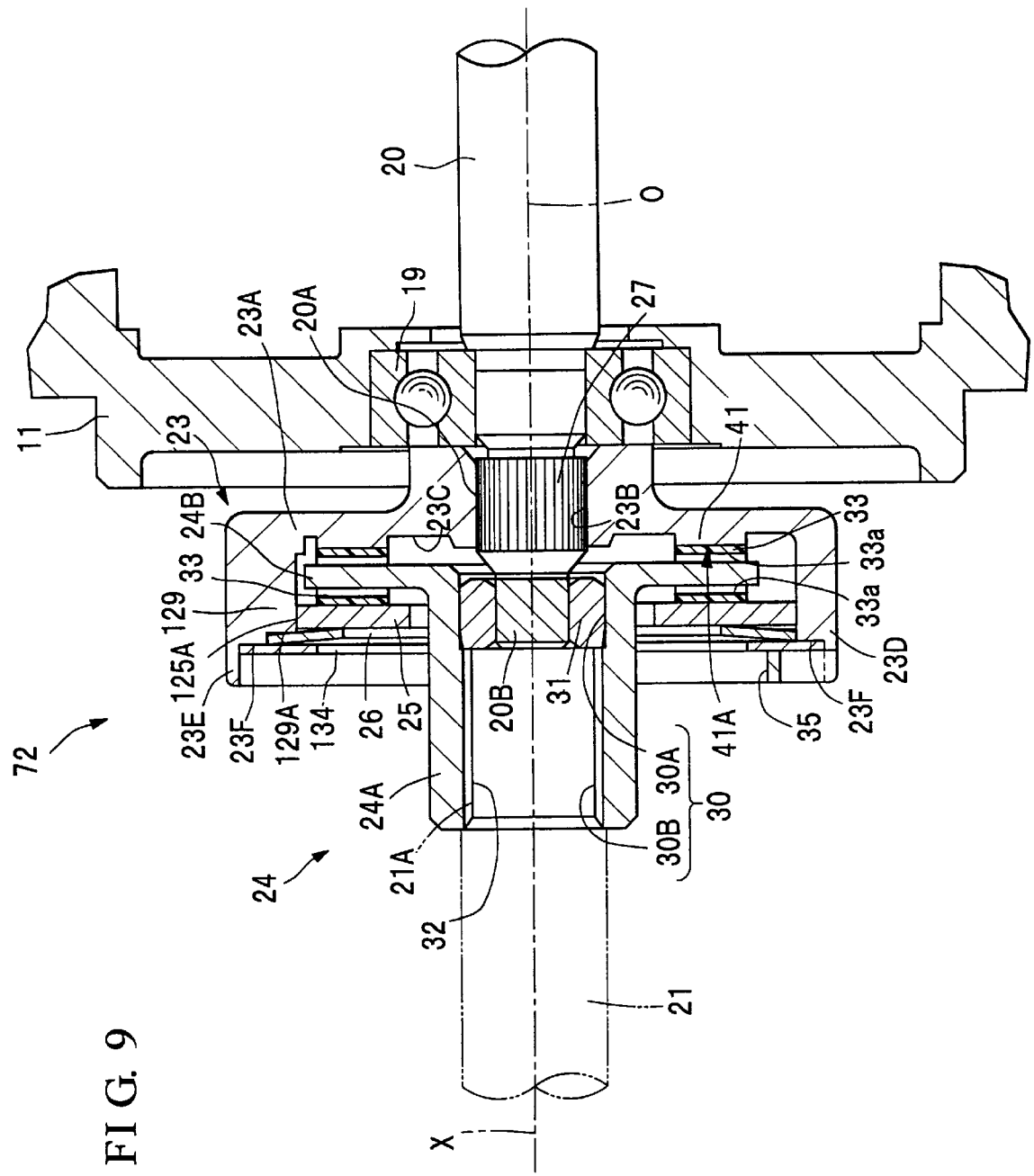
FIG. 9 is a sectional view showing torque limiter 72 of the sixth embodiment according to the present invention.

The basic structure of the present embodiment is similar to the eighth embodiment as shown in FIG. 12; however, cylindrical portion 324A (which corresponds to portion 124A in FIG. 12) and flange portion 124B (the same as the portion in FIG. 9) are directly coupled without using bush 140 which is used in FIG. 9. That is, at one end of the flange portion side of cylindrical portion 324A, circular groove 324C is formed, whose center line agrees with center axis X, and flange portion 124B is clamped and attached in a manner such that the edge of the flange portion at the mounting hole 124C side (that is, the center side) is fit into the above circular groove 324C.

In this structure, a bush for coupling the cylindrical portion and the flange portion is unnecessary; thus, the number of parts necessary for the limiter plate and the number of necessary manufacturing steps can be reduced.

Figure 14:
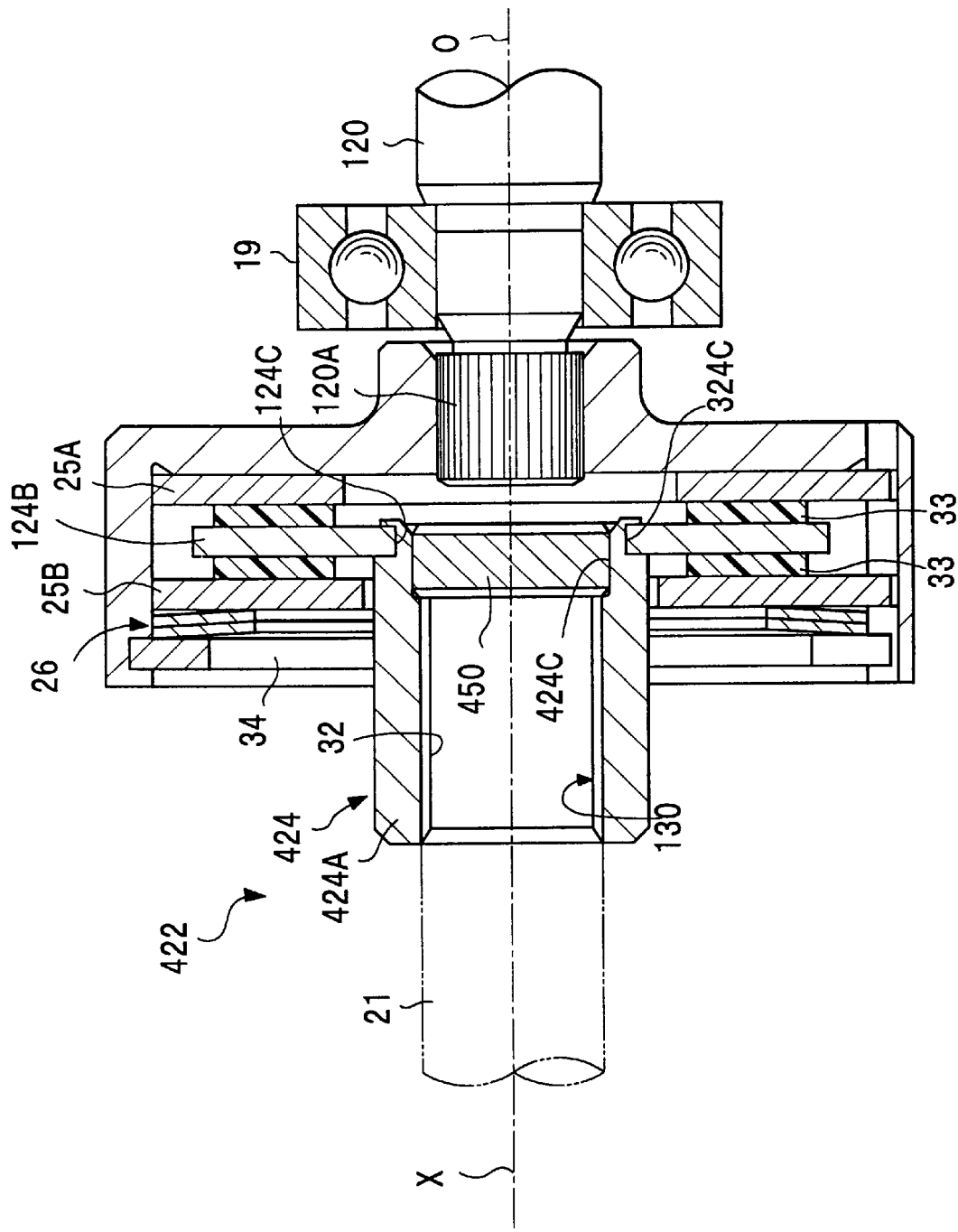
FIG. 14 is a sectional view showing torque limiter 422 of the tenth embodiment according to the present invention.

FIG. 14 is a sectional view showing the torque limiter (422) of the power steering system of the tenth embodiment according to the present invention. In the figure, parts identical to those in FIGS. 10, 12, and 13 are given identical reference numerals, and explanations thereof are omitted.

In the present structure, cylindrical portion 424A (which corresponds to portion 324A in FIG. 13) and flange portion 124B (the same as the portion in FIG. 13) as components of limiter plate 424 are directly coupled as in the tenth embodiment, and cap 450 is further pressed into the cylindrical portion. As shown in FIG. 14, in cylindrical portion 424A, portion 424C of cylindrical portion 324A where cap 450 is positioned has a diameter one-step larger than that of other portions.

In this arrangement, coned disk springs 26 are provided at the C-ring 34 side as in the arrangement shown in FIG. 10, although two disk springs are used here.

Additionally, according to the present arrangement, it is possible to prevent grease (or the like) coated on input shaft 21 and cylindrical portion 424A of limiter plate 424 from being extruded into limiter cover 23.

Figure 15:
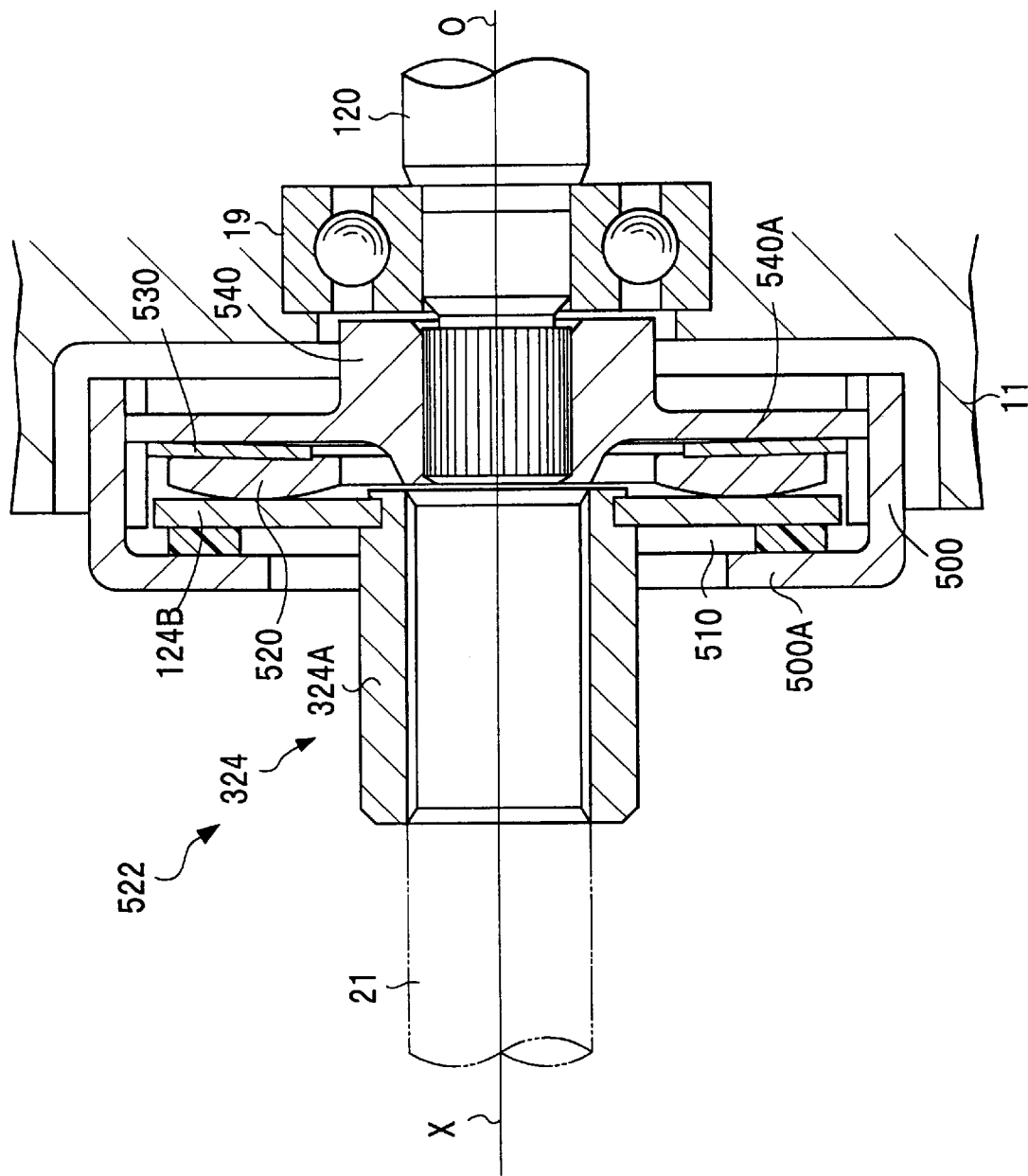
FIG. 15 is a sectional view showing torque limiter 522 of the eleventh embodiment according to the present invention.
Figure 16:
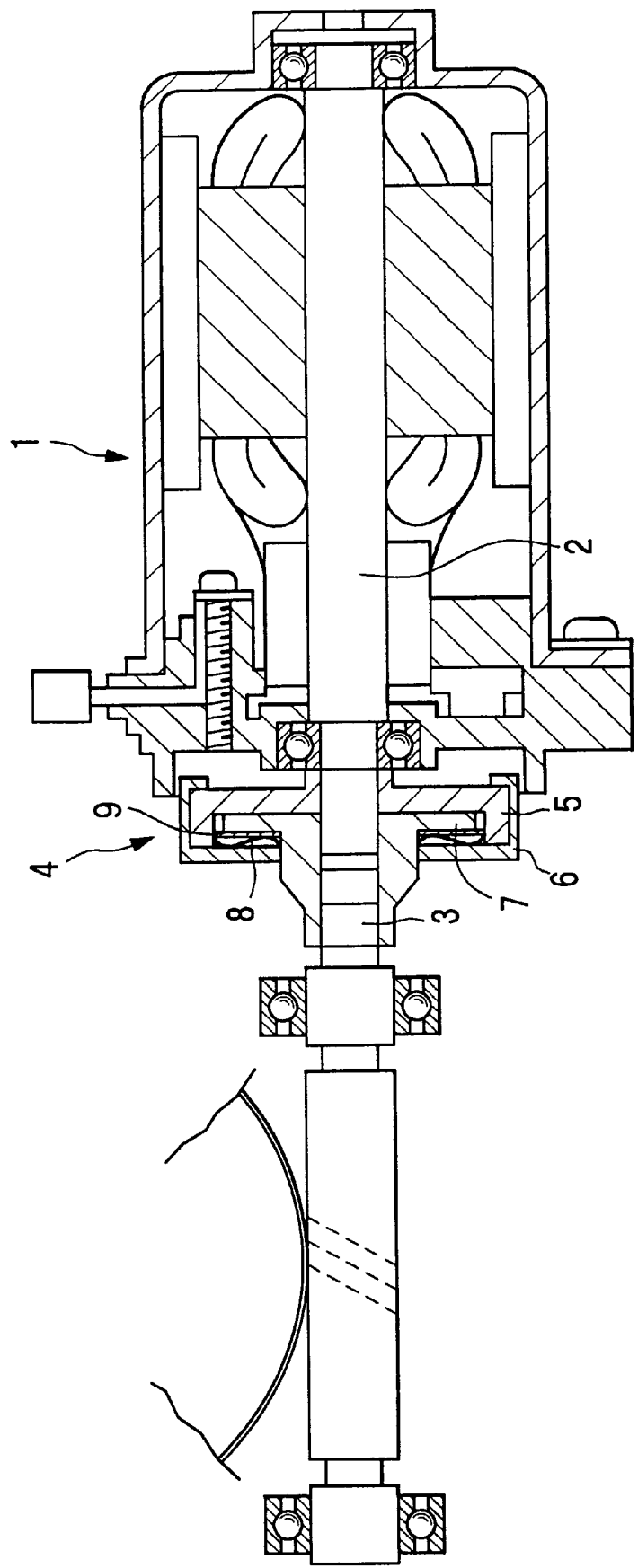
FIG. 16 is a sectional view showing a conventional power steering system.

FIG. 15 is a sectional view showing the torque limiter (522) of the power steering system of the eleventh embodiment according to the present invention. In the figure, parts identical to those in FIGS. 10 and 13 are given identical reference numerals, and explanations thereof are omitted.

The torque limiter 522 in the present embodiment has the same limiter plate 324 as that in the ninth embodiment shown in FIG. 13; however, the structure for forcing flange portion 124B of the present limiter plate onto the cover side so as to generate frictional force and relevant assembling processes are different from those in the ninth embodiment.

In FIG. 15, reference numeral 500 indicates a cylindrical case without a bottom at the output shaft 120 side, and the input shaft 21 side of the case 500 has disk-shaped edge 500A of a specific width. In the assembling process of the present embodiment, flange portion 124B of limiter plate 324 is disposed at the back-face side of edge 500A of case 500 via disk-shaped facing material 510, and further via disk-shaped sliding material 520 and coned disk spring 530, base 540 is attached to case 500.

Base 540 has a shape in which disk-shaped portion 540A is provided around its center portion which is pressed into the driving unit side (simultaneously, to which the head portion of output shaft 120 is inserted). The base 540 is mounted to case 500 through a process in which grooves are threaded on both the outer-peripheral area of disk-shaped portion 540A and the corresponding inner-peripheral area of case 500, and then base 540 is screwed into case 500. Sliding frictional force is variable through adjustment of the length of screwing.

It is also possible to provide a notch portion in the outer-peripheral area of the disk-shaped portion 540A and to clamp and fix the case 500 side to this notch portion.

Sliding material 520 functions so as to transmit a load received from the coned disk spring 530 to flange portion 124B of limiter plate 324, and thus relates to sliding between coned disk spring 530 and limiter plate 324. Therefore, a material, which can maintain its original shape for a long period even though it receives the load of the coned disk spring, is used for the sliding material 520. Here, a metallic material is used; however, a resin suitable for the above conditions may also be used. It is preferable that a face of sliding material 520, which is in contact with flange portion 124B of limiter plate 324, have a curved surface and be in contact with the flange portion in a curvilinear locus, as shown in FIG. 15, so as to prevent a change of the face, which is in contact with flange portion 124B, from influencing sliding torque.

In addition, facing material 510 may be adhered on the back face of edge 500A of case 500, or may be omitted when the back face of edge 500A is made rough.

In the present embodiment, the unit assembled as described above is pressed into the driving unit (i.e., motor) side. In this case, before the process for attaching the assembly unit to the driving unit, it is possible to temporarily fix the base 540 and to perform adjustments relating to wear, sliding torque, or the like, only for this assembly unit.

What is claimed is:

1. A power steering system in which an output shaft of a driving unit and an input shaft of a steering unit that produces a rotational torque in response to an impact force transmitted by the steering unit are coupled via a torque limiter, the torque limiter comprising:

a substantially-cylindrical limiter cover with a bottom, the limiter cover combined with and rotatable together with one of the output shaft and the input shaft; and a limiter plate contained within the limiter cover, the limiter plate being combined with and rotatable together with the other of the output shaft and the input shaft;

a forcing member supported by the limiter cover for forming the limiter plate toward the limiter cover;

a supporting member for supporting the forcing member fit in a concave portion formed in an inner-peripheral area of the limiter cover; and wherein the torque generated by impact force transmitted from the steering unit is absorbed by the sliding action generated by rotation of the limiter cover relative to the limiter plate.

2. A power steering system as claimed in claim 1, wherein the supporting member is a ring-shaped member having an inner-diameter smaller than the diameter of the limiter cover inner-peripheral area, and the forcing member is supported via the ring-shaped member.

3. A power steering system as claimed in claim 2, wherein the concave portion is circularly formed in the inner-peripheral area of the limiter cover and the ring-shaped supporting member is a C-ring which is disposed in the concave portion in a form having a slightly reduced diameter and which is forced toward its expanding direction.

4. A power steering system as claimed in any one of claims 1, 2, and 3, wherein one of the output shaft and the input shaft and the limiter plate are coaxially coupled via a metal bush to enable relative rotation.

5. A power steering system as claimed in any one of claims 1, 2, and 3, wherein on the bottom of the limiter cover, a one-step projecting convex portion is formed.

* * * * *

UNITED STATES PATENT AND TRADEMARK OFFICE
CERTIFICATE OF CORRECTION

PATENT NO. : 6,231,448 B1  
DATED : May 15, 2001  
INVENTOR(S) : Hideaki Abe et al.

Page 1 of 1

It is certified that error appears in the above-identified patent and that said Letters Patent is hereby corrected as shown below:

<u>Column 20,</u>  
Lines 11 to 12, change "a forcing member ...for forming the limiter plate toward the limiter cover" to -- a forcing member for forcing the limiter plate toward the limiter cover --

Signed and Sealed this

Fifth Day of March, 2002

*Attest:*

*Attesting Officer*

JAMES E. ROGAN  
*Director of the United States Patent and Trademark Office*